United States Patent
Da Silva

(10) Patent No.: US 11,317,308 B2
(45) Date of Patent: *Apr. 26, 2022

(54) UPDATE OF CELL QUALITY DERIVATION PARAMETERS

(71) Applicant: TELEFONAKTIEBOLAGET LM ERICSSON (PUBL), Stockholm (SE)

(72) Inventor: Icaro L. J. Da Silva, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 3 days.

This patent is subject to a terminal disclaimer.

(21) Appl. No.: 16/761,108

(22) PCT Filed: Nov. 1, 2018

(86) PCT No.: PCT/IB2018/058592
§ 371 (c)(1),
(2) Date: May 1, 2020

(87) PCT Pub. No.: WO2019/087128
PCT Pub. Date: May 9, 2019

(65) Prior Publication Data
US 2020/0359245 A1     Nov. 12, 2020

Related U.S. Application Data

(60) Provisional application No. 62/580,161, filed on Nov. 1, 2017.

(51) Int. Cl.
*H04W 24/10* (2009.01)
*H04B 7/06* (2006.01)
(Continued)

(52) U.S. Cl.
CPC ......... *H04W 24/10* (2013.01); *H04B 7/0626* (2013.01); *H04B 7/0695* (2013.01); *H04L 5/0051* (2013.01); *H04W 56/001* (2013.01)

(58) Field of Classification Search
CPC .. H04W 56/001; H04W 24/10; H04L 5/0051; H04B 7/0626; H04B 7/0695
See application file for complete search history.

(56) References Cited

U.S. PATENT DOCUMENTS

2013/0344869 A1* 12/2013 Yamada ............ H04W 36/0094
455/436
2014/0087715 A1   3/2014 Suzuki et al.
(Continued)

OTHER PUBLICATIONS

Ericsson, Summary of [NR-AH2#13][NR/RRM] TP on RRM, Tdoc R2-1707855, 3GPP TSG-RAN WG2 #NR Ad Hoc, Berlin, Germany, Aug. 21-25, 2017.
(Continued)

*Primary Examiner* — Deepa Belur
(74) *Attorney, Agent, or Firm* — Sage Patent Group

(57) ABSTRACT

According to some embodiments, a method performed by a wireless device for updating measurement configuration comprises receiving a measurement configuration from a network node. The measurement configuration comprises a measurement object that includes at least one cell quality derivation parameter. The wireless device has previously stored measurement results associated with the measurement object. The method further comprises: determining the measurement object includes a reconfigured cell quality derivation parameter that changes the way the wireless device determines the quality of a cell; determining a portion of the previously stored measurement results were computed based on the reconfigured cell quality derivation parameter; and removing the portion of the previously stored measurement results. The method may further comprise resetting timers and removing measurement information associated with the removed measurement results.

20 Claims, 10 Drawing Sheets

4100

4112 – receive a measurement configuration from a network node

4114 – the measurement object includes a reconfigured cell quality derivation parameter that changes the way the wireless device performs beam measurements or selects beam measurements for reporting 4116 – determine a portion of previously stored measurement results were computed based on the reconfigured cell quality derivation parameter 4118 – remove the portion of the previously stored measurement results

(51) Int. Cl.
*H04L 5/00* (2006.01)
*H04W 56/00* (2009.01)

(56) References Cited

U.S. PATENT DOCUMENTS

| | | | |
|---|---|---|---|
| 2018/0192438 A1* | 7/2018 | John Wilson | H04B 7/088 |
| 2019/0268782 A1* | 8/2019 | Martin | H04W 36/0094 |
| 2020/0267583 A1* | 8/2020 | Cheng | H04W 48/16 |
| 2021/0195451 A1* | 6/2021 | Da Silva | H04W 36/0058 |

OTHER PUBLICATIONS

CATT, Configurations for cell quality derivation and beam reporting, R2-1707902, Revision of R2-1706401, 3GPP TSG-RAN WG2 #99, Berlin, Germany, Aug. 21-25, 2017.

3rd Generation Partnership Project; Technical Specification Group Radio Access Network; Evolved Universal Terrestrial Radio Access (E-UTRA) Radio Resource Control (RRC); Protocol specification (Release 8), 3GPP TS 36.331 V8.5.0 (Mar. 2009).

ZTE Corporation, Discussion on measurement report, R2-1706895, 3GPP TSG RAN WG2#NR_AdHoc#2, Qingdao, China, Jun. 27-29, 2017.

Huawei, et al., Measurement configuration and reporting for mobility considering beamforming, R2-1705527, 3GPP TSG-RAN2 Meeting #98, Hangzhou, China, May 15-19, 2017.

* cited by examiner

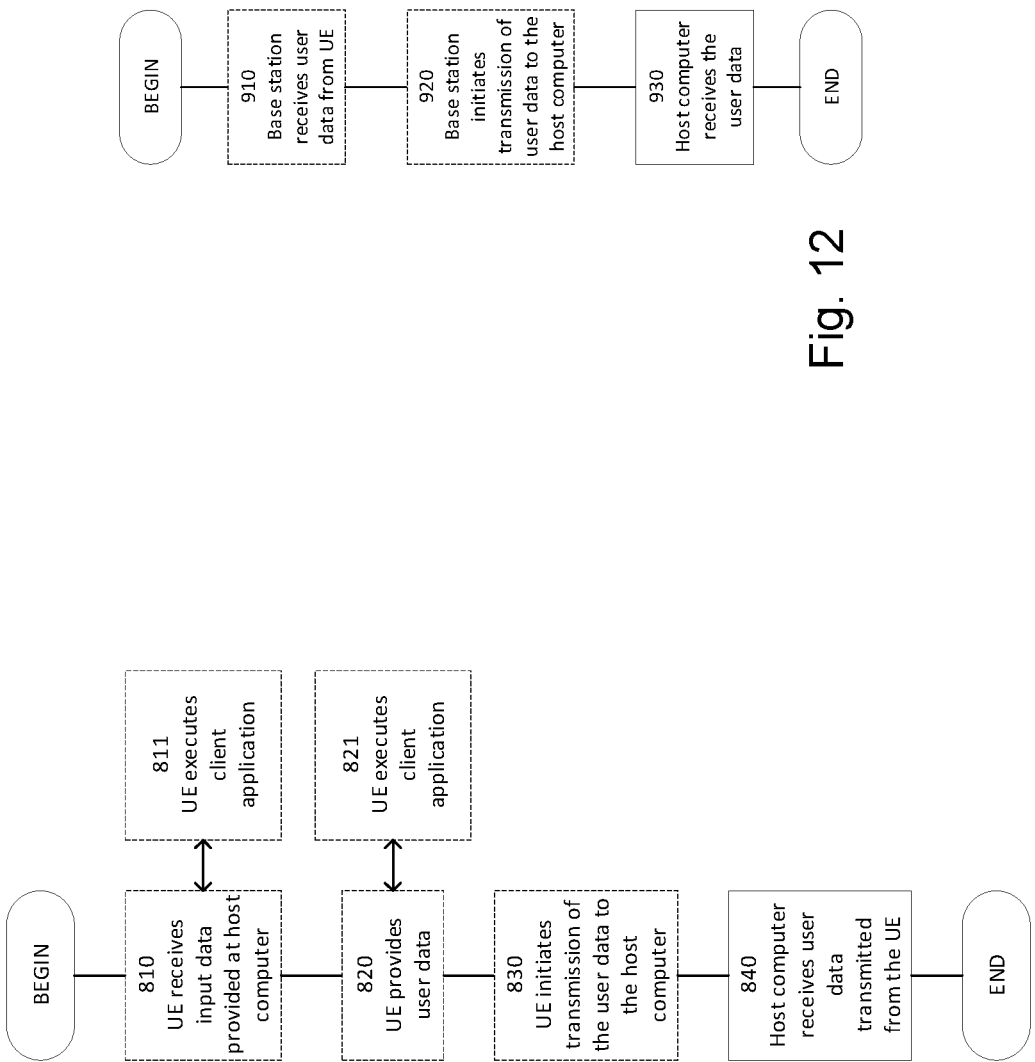

UPDATE OF CELL QUALITY DERIVATION PARAMETERS

This application is a 371 of International Application No. PCT/IB2018/058592, filed Nov. 1, 2018, which claims the benefit of U.S. Application No. 62/580,161, filed Nov. 1, 2017, the disclosures of which are fully incorporated herein by reference.

TECHNICAL FIELD

Embodiments of the present disclosure are directed to wireless communications and, more particularly, to user equipment (UE) actions when receiving updated to cell quality derivation parameters in fifth generation (5G) new radio (NR).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Third generation Partnership Project (3GPP) long term evolution (LTE) includes measurement objects that describe how a user equipment (UE) measures a reference signal and how the UE reports the measurements to the network. The network configures each measurement via a measurement identifier (measId) that links a measurement object (i.e., a carrier frequency and a report configuration (reportConfig) that may contain an event like A1, A2, A6, etc. as defined in 3GPP TS 36.331). LTE specifications also define a procedure to modify and/or add a measurement object. Upon receiving a measurement configuration update, the UE deletes measurements associated with the updated measurement object and resets reporting timers (i.e., the UE discards all measurement identifiers associated with the carrier frequency). The procedure makes sense for LTE because the measurement object updates likely relate to the manner in which a UE triggers events (e.g., when a new cell is added/removed from one of the maintained lists (white lists or blacklists), or when new cells are added/removed from the cell specific offset lists, etc. The procedural text from the radio resource control (RRC) specifications and the ASN.1 for the E-UTRA measObject highlighted below are an example.

for each measObjectId included in the received measObjectToAddModList:
  if an entry with the matching measObjectId exists in the measObjectList within the VarMeasConfig, for this entry:
    reconfigure the entry with the value received for this measObject, except for the fields cellsToAddModList, blackCellsToAddModList, whiteCellsToAddModList, altTTT-CellsToAddModList, cellsToRemoveList, blackCellsToRemoveList, whiteCellsToRemoveList, altTTT-CellsToRemoveList, measSubframePatternConfigNeigh, measDS-Config, wlan-ToAddModList and wlan-ToRemoveList;
  if the received measObject includes the cellsToRemoveList:
    for each cellIndex included in the cellsToRemoveList:
      remove the entry with the matching cellIndex from the cellsToAddModList;
  if the received measObject includes the cellsToAddModList:
    for each cellIndex value included in the cellsToAddModList:
      if an entry with the matching cellIndex exists in the cellsToAddModList:
        replace the entry with the value received for this cellIndex;
      else:
        add a new entry for the received cellIndex to
  if the received measObject includes the blackCellsToRemoveList:
    for each cellIndex included in the blackCellsToRemoveList:
      remove the entry with the matching cellIndex from the blackCellsToAddModList;
NOTE 1: For each cellIndex included in the blackCellsToRemoveList that concerns overlapping ranges of cells, a cell is removed from the black list of cells only if all cell indexes containing it are removed.
  if the received measObject includes the blackCellsToAddModList:
    for each cellIndex included in the blackCellsToAddModList:
      if an entry with the matching cellIndex is included in the blackCellsToAddModList:
        replace the entry with the value received for this cellIndex;
      else:
        add a new entry for the received cellIndex to the blackCellsToAddModList;
  if the received measObject includes the whiteCellsToRemoveList:
    for each cellIndex included in the whiteCellsToRemoveList:
      remove the entry with the matching cellIndex from the white CellsToAddModList;
NOTE 2: For each cellIndex included in the whiteCellsToRemoveList that concerns overlapping ranges of cells, a cell is removed from the white list of cells only if all cell indexes containing it are removed.
  if the received measObject includes the whiteCellsToAddModList:
    for each cellIndex included in the whiteCellsToAddModList:
      if an entry with the matching cellIndex is included in the whiteCellsToAddModList:
        replace the entry with the value received for this cellIndex;
      else:
        add a new entry for the received cellIndex to the whiteCellsToAddModList;

if the received measObject includes the altTTT-CellsToRemoveList:
   for each cellIndex included in the altTTT-CellsToRemoveList:
      remove the entry with the matching cellIndex from the altTTT-CellsToAddModList;
NOTE 3: For each cellIndex included in the altTTT-CellsToRemoveList that concerns overlapping ranges of cells, a cell is removed from the list of cells only if all cell indexes containing it are removed.
if the received measObject includes the altTTT-CellsToAddModList:
   for each cellIndex value included in the altTTT-CellsToAddModList:
      if an entry with the matching cellIndex exists in the altTTT-CellsToAddModList:
         replace the entry with the value received for this cellIndex;
      else:
         add a new entry for the received cellIndex to the altTTT-CellsToAddModList;
if the received measObject includes measSubframePatternConfigNeigh:
   set measSubframePatternConfigNeigh within the VarMeasConfig to the value of the received field
if the received measObject includes measDS-Config:
   if measDS-Config is set to setup:
      if the received measDS-Config includes the measCSI-RS-ToRemoveList:
         for each measCSI-RS-Id included in the measCSI-RS-ToRemoveList:
            remove the entry with the matching measCSI-RS-Id from the measCSI-RS-ToAddModList;
      if the received measDS-Config includes the measCSI-RS-ToAddModList, for each measCSI-RS-Id value included in the measCSI-RS-ToAddModList:
         if an entry with the matching measCSI-RS-Id exists in the measCSI-RS-ToAddModList:
            replace the entry with the value received for this measCSI-RS-Id;
         else:
            add a new entry for the received measCSI-RS-Id to the measCSI-RS-ToAddModList;
      set other fields of the measDS-Config within the VarMeasConfig to the value of the received fields;
      perform the discovery signals measurement timing configuration procedure as specified in 5.5.2.10;
   else:
      release the discovery signals measurement configuration;
for each measId associated with this measObjectId in the measIdList within the VarMeasConfig, if any:
   remove the measurement reporting entry for this measId from the VarMeasReportList, if included;
   stop the periodical reporting timer or timer T321, whichever one is running, and reset the associated
if the received measObject includes the wlan-ToRemoveList:
   for each WLAN-Identifiers included in the wlan-ToRemoveList:
      remove the entry with the matching WLAN-Identifiers from the wlan-ToAddModList;
NOTE 3a: Matching of WLAN-Identifiers requires that all WLAN identifier fields should be same.
if the received measObject includes the wlan-ToAddModList:
   for each WLAN-Identifiers included in the wlan-ToAddModList:
      add a new entry for the received WLAN-Identifiers to the wlan-ToAddModList;
if the received measObject includes the tx-ResourcePoolToRemoveList:
   for each v2x-poolIdentity in tx-ResourcePoolToRemoveList:
      remove the entry with the matching v2x-poolIdentity; from the tx-ResourcePoolToAddList;
if the received measObject includes the tx-ResourcePoolToAddList:
   for each v2x-poolIdentity in tx-ResourcePoolToAddList:
      add a new entry for the received v2x-poolIdentity to the tx-ResourcePoolToAddList;
else:
add a new entry for the received measObject to the measObjectList within VarMeasConfig; NOTE 4: UE does not need to retain cellForWhichToReportCGI in the measObject after reporting cgi-Info.

LTE defines a measurement object using ASN.1. The information element (IE) MeasObjectEUTRA specifies information applicable for intra-frequency or inter-frequency E-UTRA cells.

| MeasObjectEUTRA information element | | |
|---|---|---|
| -- ASN1START | | |
| MeasObjectEUTRA ::= | | SEQUENCE { |
|    carrierFreq | |    ARFCN-ValueEUTRA, |
|    allowedMeasBandwidth | |    AllowedMeasBandwidth, |
|    presenceAntennaPort1 | |    Presence AntennaPort1, |
|    neighCellConfig | |    NeighCellConfig, |
|    offsetFreq | |    Q-OffsetRange |
|       DEFAULT dB0, | | |
| -- Cell list | | |
| cellsToRemoveList | | CellIndexList |
|    OPTIONAL, | -- Need ON | |
| cellsToAddModList | | CellsToAddModList |
|    OPTIONAL, | -- Need ON | |
| -- Black list | | |
| blackCellsToRemoveList | | CellIndexList |
|    OPTIONAL, | -- Need ON | |
| blackCellsToAddModList | | BlackCellsToAddModList |
|    OPTIONAL, | -- Need ON | |
| cellForWhichToReportCGI | | PhysCellId |
|    OPTIONAL, | -- Need ON | |
| ..., | | |

| MeasObjectEUTRA information element |
| --- |
| ```
    [[measCycleSCell-r10                    MeasCycleSCell-r10
        OPTIONAL,                           -- Need ON
        measSubframePatternConfigNeigh-r10
        MeasSubframePatternConfigNeigh-r10              OPTIONAL
            -- Need ON
    ]],
    [[widebandRSRQ-Meas-r11                     BOOLEAN    OPTIONAL
    -- Cond WB-RSRQ
    ]],
    [[  altTTT-CellsToRemoveList-r12            CellIndexList
        OPTIONAL,                           -- Need ON
            altTTT-CellsToAddModList-r12            AltTTT-CellsToAddModList-r12
        OPTIONAL,                           -- Need ON
            t312-r12                            CHOICE {
                release                         NULL,
                setup                           ENUMERATED
{ms0, ms50, ms100, ms200,
                                                        ms300,
ms400, ms500, ms1000}
            }
                                        OPTIONAL,  -- Need ON
        reducedMeasPerformance-r12              BOOLEAN
        OPTIONAL,                           -- Need ON
        measDS-Config-r12                       MeasDS-Config-r12
OPTIONAL                                -- Need ON
    ]],
    [[
        whiteCellsToRemoveList-r13              CellIndexList
OPTIONAL,                                   -- Need ON
        whiteCellsToAddModList-r13              WhiteCellsToAddModList-r13
OPTIONAL,                                   -- Need ON
        rmtc-Config-r13                         RMTC-Config-r13
OPTIONAL,                                   -- Need ON
            carrierFreq-r13                             ARFCN-ValueEUTRA-
v9e0    OPTIONAL                        -- Need ON
    ]]
}
MeasObjectEUTRA-v9e0 ::=              SEQUENCE {
    carrierFreq-v9e0                        ARFCN-ValueEUTRA-v9e0
}
CellsToAddModList ::=                 SEQUENCE (SIZE (1..maxCellMeas))
OF CellsToAddMod
CellsToAddMod ::= SEQUENCE {
    cellIndex                               INTEGER
(1..maxCellMeas),
    physCellId                              PhysCellId,
    cellIndividualOffset                    Q-OffsetRange
}
BlackCellsToAddModList ::=            SEQUENCE (SIZE (1..maxCellMeas))
OF BlackCellsToAddMod
BlackCellsToAddMod ::=        SEQUENCE {
    cellIndex                               INTEGER
(1..maxCellMeas),
    physCellIdRange                         PhysCellIdRange
}
MeasCycleSCell-r10 ::=                ENUMERATED {sf160, sf256, sf320,
sf512,
        sf640, sf1024, sf1280, spare1}
MeasSubframePatternConfigNeigh-r10 ::= CHOICE {
    release                                 NULL,
    setup                                   SEQUENCE {
        measSubframePatternNeigh-r10            MeasSubframePattern-
r10,
        measSubframeCellList-r10                MeasSubframeCellList-
r10   OPTIONAL   -- Cond always
    }
}
MeasSubframeCellList-r10 ::=      SEQUENCE (SIZE (1..maxCellMeas)) OF
PhysCellIdRange
AltTTT-CellsToAddModList-r12 ::=      SEQUENCE (SIZE (1..maxCellMeas))
                                      OF AltTTT-
CellsToAddMod-r12
AltTTT-CellsToAddMod-r12 ::=          SEQUENCE {
    cellIndex-r12                           INTEGER
(1..maxCellMeas),
    physCellIdRange-r12                     PhysCellIdRange
}
``` |

| MeasObjectEUTRA information element |
| --- |

```
WhiteCellsToAddModList-r13 ::=           SEQUENCE (SIZE (1..maxCellMeas))
OF WhiteCellsToAddMod-r13
WhiteCellsToAddMod-r13 ::=          SEQUENCE {
    cellIndex-r13                           INTEGER
(1..maxCellMeas),
    physCellIdRange-r13                     PhysCellIdRange
}
RMTC-Config-r13 ::=CHOICE {
    release,                                NULL
    setup                                   SEQUENCE {
        rmtc-Period-r13                     ENUMERATED {ms40,
ms80, ms160, ms320, ms640},
        rmtc-SubframeOffset-r13             INTEGER(0..639)
            OPTIONAL,                   -- Need ON
        measDuration-r13                    ENUMERATED {sym1, sym14,
sym28, sym42, sym70},
        ...
    }
}
-- ASN1STOP
```

Particular challenges related to cell quality derivation, beam measurement information reporting, and measurement object update currently exist in LTE. NR differs from LTE in that for NR the derivation of cell measurement results is quite configurable, at least because of the following reasons. In NR, a cell may transmit multiple beams pointing in different directions. Because the RS used for cell quality derivation is beamformed, the UE can detect multiple beams for each cell and therefore needs to combine the beam results to derive cell measurements. In addition, NR may configure two different RS types (e.g., SS/PBCH Blocks or CSI-RS). For example, the network may, in reportConfig, configure a UE to either trigger events based on cell measurements based on SS/PBCH blocks or CSI-RS.

In NR, a UE may derive cell quality by averaging the best beam with the up to N−1 best beams above a configured absolute threshold. Cell-level RSRQ is derived by averaging beam RSRQ measurements. The averaging is done on linear domain. NR also includes RS-SINR based on SS/PBCH block and CSI-RS for L3 mobility. It may be used for triggering Ax events and reporting. Cell-level RS-SINR is derived in the same way as other cell quantities. The averaging is performed by averaging beam RS-SINR measurements, and the averaging is done on linear domain. Independent N and independent threshold may be configured per carrier frequency in the MeasObject for NR-SS based and CSI-RS based L3 mobility.

The network may configure one or more of the following parameters: (a) a threshold for selecting additional beams for averaging for measurements based on SS/PBCH blocks; (b) a threshold for selecting additional beams for averaging for measurements based on CSI-RS; (c) N parameter for the maximum number of beams to be averaged for cell measurement results based on SS/PBCH blocks; and (d) N parameter for the maximum number of beams to be averaged for cell measurement results based on CSI-RS;

A NR network may request that a UE report beam measurements associated with a given cell that has triggered measurement events (e.g., A1-A6). A measurement report may include beam measurements (based on NR-SS and CSI-RS). Then network may configure the beam measurement (e.g., the network configures a UE to report beam identifier only, beam measurement result and identifier, or no beam reporting). The network may configure measurement quantities for beam measurement reporting. For selection of x SS blocks to be included in the measurement report for each cell, the network may configure x separately from N (N used in cell quality derivation). For cell events (A1 to A6 events), selection of y CSI-RS resource to be included in the measurement report for each cell, the network may configure y separately from N (N used in cell quality derivation)

For measurement events based on NR-SS, in each cell a UE reports the best SS block and up to x−1 next highest measured SS blocks above the absolute threshold. The threshold is the same as that used for cell quality derivation. For measurement events based on CSI-RS, in each cell a UE reports the best CSI-RS and up to y−1 next highest measured CSI-RS above the absolute threshold. The threshold is the same as that used for cell quality derivation.

The parameter N for cell quality derivation (CQD), to be configured per RS type in the measObject, does not affect the way the UE performs beam measurement results to be included in measurement reports. A new parameter X is defined in reportConfig. The threshold for the selection of X−1 beams in addition to the best is the same configured in the measurement object.

The following ASN.1 structures describe the NR measurement object and reportConfig in NR (the excerpt includes a subset of the parameters).

The IE MeasObjectNR specifies information applicable for SS/PBCH block(s) intra/inter-frequency measurements or CSI-RS intra/inter-frequency measurements.

| MeasObjectNR information element |
| --- |

```
-- ASN1START
-- TAG-MEAS-OBJECT-NR-START
MeasObjectNR ::=                            SEQUENCE {
    carrierFreq                                 ARFCN-
ValueNR,
    ...
```

```
                    MeasObjectNR information element

--Consolidation of L1 measurements per RS index
    absoluteThresholdCellQuality                SEQUENCE {
        absThreshSS-BlocksConsolidation             ThresholdNR
            OPTIONAL,
        absThreshCSI-RS-Consolidation               ThresholdNR
            OPTIONAL
    }
                                                OPTIONAL,
--Config for cell measurement derivation
    maxBeamsCellQuality                         SEQUENCE {
        nroSS-BlocksToAverage                       INTEGER
(1..maxNroSS-BlocksToAverage)
            OPTIONAL,
        nroCSI-RS-ResourcesToAverage                INTEGER
(1..maxNroCSI-RS-ResourcesToAverage)
            OPTIONAL
    }
                                                    ....
}
Q-OffsetRangeList ::=                           SEQUENCE {
    rsrpOffsetSSB                                   Q-OffsetRange
        DEFAULT dB0,
    rsrqOffsetSSB                                   Q-OffsetRange
        DEFAULT dB0,
    sinrOffsetSSB                                   Q-OffsetRange
        DEFAULT dB0,
    rsrpOffsetCSI-RS                                Q-OffsetRange
        DEFAULT dB0,
    rsrqOffsetCSI-RS                                Q-OffsetRange
        DEFAULT dB0,
    sinrOffsetCSI-RS                                Q-OffsetRange
        DEFAULT dB0
}
...
-- TAG-MEAS-OBJECT-NR-STOP
-- ASN1STOP
```

The nroCSI-RS-ResourcesToAvgWithBest indicates the maximum number of measurement results per CSI-RS resources from the L1 filter(s) to be averaged with the highest measurement result from the L1 filter(s). The same value applies for each detected cell in that carrierFreq.

The nroSS-BlocksToAvgWithBest indicates the maximum number of measurement results per SS/PBCH index from the L1 filter(s) to be averaged with the highest measurement result from the L1 filter(s). The same value applies for each detected cell in that carrierFreq.

The absThreshCSI-RS-Consolidation is the absolute threshold for the consolidation of measurement results per CSI-RS resource(s) from L1 filter(s). The values above the threshold are used as input to the derivation of cell measurement results and the L3 filter(s) per CSI-RS resource.

The absThreshSS-BlocksConsolidation is the absolute threshold for the consolidation of measurement results per SS/PBCH block(s) from L1 filter(s). The values above the threshold are used as input to the derivation of cell measurement results and the L3 filter(s) per SS/PBCH block index.

The IE ReportConfigNR specifies criteria for triggering of an NR measurement reporting event. Measurement reporting events are based on cell measurement results, which can be derived based on SS/PBCH block or CSI-RS. The events are labelled AN with N equal to 1, 2 and so on.

Event A1: Serving becomes better than absolute threshold.

Event A2: Serving becomes worse than absolute threshold.

Event A3: Neighbour becomes amount of offset better than PCell/PSCell.

Event A4: Neighbour becomes better than absolute threshold.

Event A5: PCell/PSCell becomes worse than absolute threshold) AND Neighbour becomes better than another absolute threshold2.

Event A6: Neighbour becomes amount of offset better than SCell.

```
                    ReportConfigNR information element

-- ASN1START
-- TAG-REPORT-CONFIG-START
ReportConfigNR ::=                              SEQUENCE {
    reportType                                      CHOICE {
        periodical
            PeriodicalReportConfig,
        eventTriggered
```

| ReportConfigNR information element |
|---|

```
            EventTriggerConfig,
                reportCGI
            Type_FFS!,
                ...
            }
    }
}
-- Current structure allows easier definition of new events and new report types e.g. CGI, etc.
EventTriggerConfig::=                           SEQUENCE {
    eventId                                     CHOICE {
        event A1
        SEQUENCE {
            a1-Threshold
MeasTriggerQuantity,
                reportOnLeave
BOOLEAN,
                hysteresis
Hysteresis,
                timeToTrigger
TimeToTrigger
        },
        eventA2
        SEQUENCE {
            a2-Threshold
MeasTriggerQuantity,
                reportOnLeave
BOOLEAN,
                hysteresis
Hysteresis,
                timeToTrigger
TimeToTrigger
        },
        eventA3
        SEQUENCE {
            a3-Offset
MeasTriggerQuantityOffset,
                reportOnLeave
BOOLEAN,
                hysteresis
Hysteresis,
                timeToTrigger
TimeToTrigger,
                useWhiteCellList
BOOLEAN                         OPTIONAL
        },
        eventA4
        SEQUENCE {
            a4-Threshold
MeasTriggerQuantity,
                reportOnLeave
BOOLEAN,
                hysteresis
Hysteresis,
                timeToTrigger
TimeToTrigger,
                useWhiteCellList
BOOLEAN                         OPTIONAL
        },
        eventA5
        SEQUENCE {
            a5-Threshold1
MeasTriggerQuantity,
                a5-Threshold2
MeasTriggerQuantity,
                reportOnLeave
BOOLEAN,
                hysteresis
Hysteresis,
                timeToTrigger
TimeToTrigger,
                useWhiteCellList
BOOLEAN                         OPTIONAL
        },
        eventA6
```

| ReportConfigNR information element |
| --- |

```
    SEQUENCE {
        a6-Offset
    MeasTriggerQuantityOffset,
        reportOnLeave
    BOOLEAN,
        hysteresis
    Hysteresis,
        timeToTrigger
    TimeToTrigger,
        useWhiteCellList
    BOOLEAN                             OPTIONAL
    },
    },
    rsType
    SEQUENCE {
        ss
    BOOLEAN,
        csi-rs
    BOOLEAN
    }
    -- Common reporting config (at least to periodical and eventTriggered)
    reportInterval                      ReportInterval,
    reportAmount                        ENUMERATED
{FFS!},
    -- Cell reporting configuration
    reportQuantityCell
    MeasReportQuantity,
        maxReportCells                  INTEGER
(1..maxCellReport),
    -- RS index reporting configuration
    reportQuantityRsIndexes
    MeasReportQuantityIndexes
            OPTIONAL,
        maxNroIndexToReport             INTEGER
(1..maxNroIndexesToReport)
    OPTIONAL,
    -- If configured the UE includes the best neighbor cells per serving frequency
    reportAddNeighMeas                  TYPE_FFS!
}
PeriodicalReportConfig ::=              SEQUENCE {
    rsType
    SEQUENCE {
        ssb
    BOOLEAN,
        csi-rs
    BOOLEAN
    }
    -- Common reporting config (at least to periodical and eventTriggered)
    reportInterval                      ReportInterval,
    reportAmount                        ENUMERATED
{FFS!},
    -- Cell reporting configuration
    reportQuantityCell
    MeasReportQuantity,
        maxReportCells                  INTEGER
(1..maxCellReport),
    -- RS index reporting configuration
    reportQuantityRsIndexes
    MeasReportQuantityIndexes,
        maxNroRsIndexesToReport         INTEGER
(1..maxNroIndexesToReport)
}
MeasTriggerQuantity ::=                 SEQUENCE {
    rsrp
    RSRPRange,
    rsrq
    RSRQRange,
    sinr
    SINRRange
}
MeasTriggerQuantityOffset::=            SEQUENCE {
    rsrp                                INTEGER
(FFS!)                  OPTIONAL,
    rsrq                                INTEGER
(FFS!)                  OPTIONAL,
    sinr                                INTEGER
```

-continued

| ReportConfigNR information element |
| --- |

```
(FFS!)                            OPTIONAL
}
MeasReportQuantity ::=            SEQUENCE {
    ss-rsrp
    BOOLEAN                       OPTIONAL,
    ss-rsrq
    BOOLEAN                       OPTIONAL,
    ss-sinr
    BOOLEAN                       OPTIONAL,
    csi-rs-rsrp
    BOOLEAN                       OPTIONAL,
    csi-rs-rsrq
    BOOLEAN                       OPTIONAL,
    csi-rs-sinr
    BOOLEAN                       OPTIONAL
}
MeasReportQuantityIndexes::=      CHOICE {
    ss-Indexes
    BOOLEAN,
    csi-Indexes
    BOOLEAN,
    measResultsPerIndex           MeasReportQuantity
}
-- TAG-REPORT-CONFIG-START
-- ASN1STOP
    The IE MeasIdToAddModList includes a list of measurement identities to add or
modify and, for each measId, an associated measObjectId and associated reportConfigId.
            MeasIdToAddModList information element
-- ASN1START
-- TAG-MEAS-ID-TO-ADD-MOD-LIST-START
MeasIdToAddModList ::=            SEQUENCE (SIZE (1..maxMeasId)) OF
MeasIdToAddMod
MeasIdToAddMod ::=    SEQUENCE {
    measId                        MeasId,
    measObjectId                  MeasObjectId
    OPTIONAL,
    reportConfigId                ReportConfigId
}
-- TAG-MEAS-ID-TO-ADD-MOD-LIST-STOP
-- ASN1STOP
```

In LTE, when the measurement object is updated, a UE resets all measurement related timers and variables and discards measurements associated to the measurement object to be updated. The procedure is described in 36.331 and is reproduced above.

SUMMARY

Based on the description above, certain challenges currently exist. For example, current user equipment (UE) behavior when the network triggers a measurement update procedure in fifth generation (5G) new radio (NR) is that the NR parameters configured in the measurement object were not defined in long term evolution (LTE) and UE actions upon the re-configuration of the new parameters is unknown. Resetting all measurements and related information may not be necessary for particular updates.

Particular embodiments may provide solutions to these or other challenges. For example, certain embodiments include a method where the UE discards or stores existing measurement information (for beam(s), cell(s), RS type(s), bandwidth parts) and resets timers and measurement related UE variables depending on the parameters (or combinations of parameters) provided by the network when updating cell quality derivation parameters or beam consolidation parameters. Particular embodiments include UE actions upon reconfiguring cell quality derivation (CQD) parameters and beam measurement consolidation parameters in terms of storing or removing cell/beam measurements, possibly per RS type, when certain parameters are updated or not for the same measurement object linked to configured measurements.

According to some embodiments, a method performed by a wireless device for updating measurement configuration comprises receiving a measurement configuration from a network node. The measurement configuration comprises a measurement object that includes at least one CQD parameter. The wireless device has previously stored measurement results associated with the measurement object. The method further comprises: determining the measurement object includes a reconfigured CQD parameter that changes the way the wireless device determines the quality of a cell; determining a portion of the previously stored measurement results were computed based on the reconfigured CQD parameter; and removing the portion of the previously stored measurement results. The method may further comprise resetting timers and removing measurement information associated with the removed measurement results.

In particular embodiments, the measurement object includes a first CQD parameter indicating a maximum number of beams to average for cell measurement results and a second CQD parameter indicating a signal quality threshold for selecting additional beams to average for cell measurement results. Determining the measurement object includes a reconfigured parameter that changes the way the wireless device determines the quality of a cell comprises determining the measurement object includes at least one of the first CQD parameter and the second CQD parameter, or determining at least one of the first CQD parameter and the second CQD parameter is changed.

In particular embodiments, determining the measurement object includes a reconfigured parameter that changes the way the wireless device determines the quality of a cell comprises determining: the first parameter is changed; or the second parameter is changed, and the first parameter is changed to a value greater than one or the first parameter was not changed but was greater than one before receiving the measurement configuration.

In particular embodiments, the first CQD parameter comprises a maximum number of beams to average for cell measurements based on a channel state information reference signal (CSI-RS) and the second CQD parameter comprises a signal quality threshold for selecting additional beams to average based on a CSI-RS, or the first CQD parameter comprises a maximum number of beams to average for cell measurements based on a synchronization symbol (SS) and the second CQD parameter comprises a signal quality threshold for selecting additional beams to average based on a SS.

In particular embodiments, the measurement configuration further comprises a report configuration associated with the measurement object. The report configuration comprises an indication of a reference signal type (e.g., CSI-RS or SS). Determining the measurement object includes a reconfigured parameter that changes the way the wireless device determines the quality of a cell further comprises determining that the first CQD parameter and the second CQD parameter are based on CSI-RS and the reference signal type is CSI-RS, or determining that the first CQD parameter and the second CQD parameter are based on SS and the reference signal type is SS.

According to some embodiments, a wireless device is operable to update a measurement configuration. The wireless device comprises processing circuitry operable to receive a measurement configuration from a network node. The measurement configuration comprises a measurement object that includes at least one CQD parameter. The wireless device has previously stored measurement results associated with the measurement object. The processing circuitry is further operable to: determine the measurement object includes a reconfigured CQD parameter that changes the way the wireless device determines the quality of a cell; determine a portion of the previously stored measurement results were computed based on the reconfigured CQD parameter; and remove the portion of the previously stored measurement results. The processing circuitry may be further operable to reset timers and remove measurement information associated with the removed measurement results.

In particular embodiments, the measurement object includes a first CQD parameter indicating a maximum number of beams to average for cell measurement results and a second CQD parameter indicating a signal quality threshold for selecting additional beams to average for cell measurement results. The processing circuitry is operable to determine the measurement object includes a reconfigured parameter that changes the way the wireless device determines the quality of a cell by determining the measurement object includes at least one of the first CQD parameter and the second CQD parameter, or determining at least one of the first CQD parameter and the second CQD parameter is changed.

In particular embodiments, the processing circuitry is operable to determine the measurement object includes a reconfigured parameter that changes the way the wireless device determines the quality of a cell by determining: the first parameter is changed; or the second parameter is changed, and the first parameter is changed to a value greater than one or the first parameter was not changed but was greater than one before receiving the measurement configuration.

In particular embodiments, the first CQD parameter comprises a maximum number of beams to average for cell measurements based on a CSI-RS and the second CQD parameter comprises a signal quality threshold for selecting additional beams to average based on a CSI-RS; or the first CQD parameter comprises a maximum number of beams to average for cell measurements based on a synchronization symbol (SS) and the second CQD parameter comprises a signal quality threshold for selecting additional beams to average based on a SS.

In particular embodiments, the measurement configuration further comprises a report configuration associated with the measurement object. The report configuration comprises an indication of a reference signal type (e.g., CSI-RS or SS). The processing circuitry is operable to determine the measurement object includes a reconfigured parameter that changes the way the wireless device determines the quality of a cell by determining that the first CQD parameter and the second CQD parameter are based on CSI-RS and the reference signal type is CSI-RS, or determining that the first CQD parameter and the second CQD parameter are based on SS and the reference signal type is SS.

According to some embodiments, a method performed by a wireless device for updating measurement configuration comprises receiving a measurement configuration from a network node. The measurement configuration comprises a measurement object that includes at least one CQD parameter. The wireless device has previously stored measurement results associated with the measurement object. The method further comprises: determining the measurement object includes a reconfigured CQD parameter that changes the way the wireless device performs beam measurements or selects beam measurements for reporting; determining a portion of the previously stored measurement results were computed based on the reconfigured CQD parameter; and removing the portion of the previously stored measurement results. The method may further comprise resetting timers and removing measurement information associated with the removed measurement results.

In particular embodiments, the CQD parameter comprises a signal quality threshold for selecting additional beams to average for cell measurement results. Determining the measurement object includes a reconfigured parameter that changes the way the wireless device performs beam measurements or selects beam measurements for reporting comprises determining the measurement object includes the CQD parameter, or determining the CQD parameter is changed.

In particular embodiments, the CQD parameter comprises a signal quality threshold for selecting additional beams to average based on a CSI-RS or a signal quality threshold for selecting additional beams to average based on a SS.

In particular embodiments, the measurement configuration further comprises a report configuration associated with the measurement object. The report configuration comprises an indication of a reference signal type (e.g., CSI-RS or SS). Determining the measurement object includes a reconfigured parameter that changes the way the wireless device performs beam measurements or selects beam measurements for reporting further comprises determining that the CQD parameter is based on CSI-RS and the reference signal type is CSI-RS, or determining that the CQD parameter is based on SS and the reference signal type is SS.

According to some embodiments, a wireless device is operable to update a measurement configuration. The wireless device comprises processing circuitry operable to receive a measurement configuration from a network node. The measurement configuration comprises a measurement object that includes at least one CQD parameter. The processing circuitry is further operable to determine the measurement object includes a reconfigured CQD parameter that changes the way the wireless device performs beam measurements or selects beam measurements for reporting; determine a portion of the previously stored measurement results were computed based on the reconfigured CQD parameter; and remove the portion of the previously stored measurement results. The processing circuitry may be further operable to reset timers and remove measurement information associated with the removed measurement results.

In particular embodiments, the CQD parameter comprises a signal quality threshold for selecting additional beams to average for cell measurement results. The processing circuitry is operable to determine the measurement object includes a reconfigured parameter that changes the way the wireless device performs beam measurements or selects beam measurements for reporting by determining the measurement object includes the CQD, or determining the CQD parameter is changed.

In particular embodiments, the CQD parameter comprises a signal quality threshold for selecting additional beams to average based on a CSI-RS or a signal quality threshold for selecting additional beams to average based on a SS.

In particular embodiments, the measurement configuration further comprises a report configuration associated with the measurement object. The report configuration comprises an indication of a reference signal type (e.g., CSI-RS or SS). The processing circuitry is operable to determine the measurement object includes a reconfigured parameter that changes the way the wireless device performs beam measurements or selects beam measurements for reporting by determining that the CQD parameter is based on CSI-RS and the reference signal type is CSI-RS, or determining that the CQD parameter is based on SS and the reference signal type is SS.

According to some embodiments, a wireless device is operable to update a measurement configuration. The wireless device comprises a receiving unit, a determining unit, and a removing unit. The receiving unit is operable to receive a measurement configuration from a network node. The measurement configuration comprises a measurement object that includes at least one CQD parameter. The wireless device has previously stored measurement results associated with the measurement object. The determining unit is operable to determine the measurement object includes a reconfigured CQD parameter that changes the way the wireless device determines the quality of a cell, and determine a portion of the previously stored measurement results were computed based on the reconfigured CQD parameter. The removing unit is operable to remove the portion of the previously stored measurement results.

According to some embodiments, a wireless device is operable to update a measurement configuration. The wireless device comprises a receiving unit, a determining unit, and a removing unit. The receiving unit is operable to receive a measurement configuration from a network node. The measurement configuration comprises a measurement object that includes at least one CQD parameter. The wireless device has previously stored measurement results associated with the measurement object. The determining unit is operable to determine the measurement object includes a reconfigured CQD parameter that changes the way the wireless device performs beam measurements or selects beam measurements for reporting, and determine a portion of the previously stored measurement results were computed based on the reconfigured CQD parameter. The removing unit is operable to remove the portion of the previously stored measurement results.

Also disclosed is a computer program product comprising a non-transitory computer readable medium storing computer readable program code, the computer readable program code operable, when executed by processing circuitry to perform any of the methods performed by the wireless device described above.

Certain embodiments may provide one or more of the following technical advantages. For example, the UE does not need to unnecessarily discard previously performed measurements when cell quality derivation or beam consolidation parameters are being updated.

BRIEF DESCRIPTION OF THE DRAWINGS

For a more complete understanding of the disclosed embodiments and their features and advantages, reference is now made to the following description, taken in conjunction with the accompanying drawings, in which:

FIG. 11 is a flowchart illustrating a method implemented in a communication system, according to certain embodiments; and FIG. 12 is a flowchart illustrating a method implemented in a communication system, according to certain embodiments.

DETAILED DESCRIPTION

Figure 1:
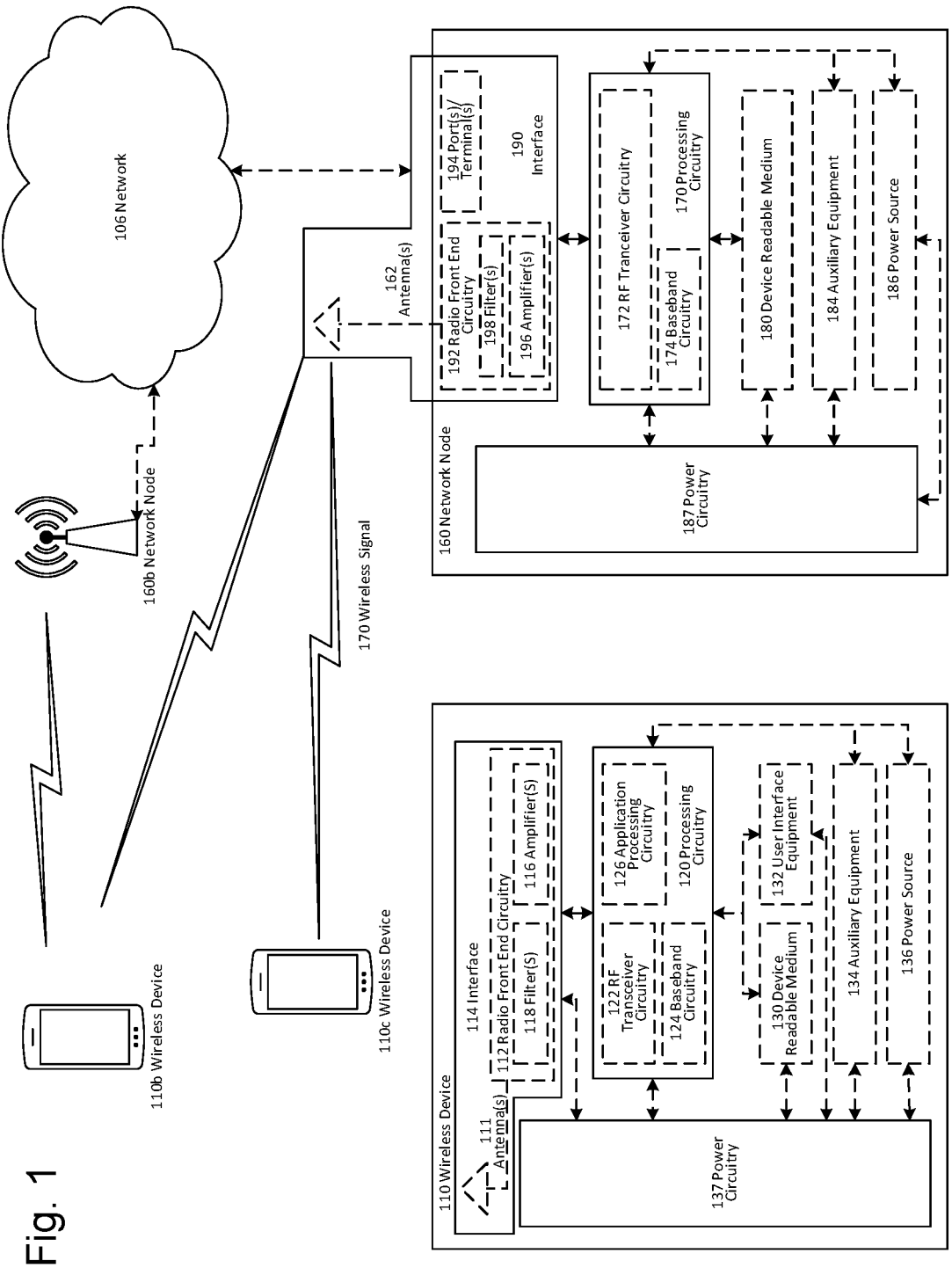
FIG. 1 is a block diagram illustrating an example wireless network.

As described above, certain challenges currently exist with updating measurement configurations in fifth generation (5G) new radio (NR). For example, NR includes additional configuration parameters that increase the complexity of the measurement object. Resetting all measurements and related information may not be necessary when only certain parameters are updated.

Particular embodiments may provide solutions to these or other challenges. For example, certain embodiments include a method where the UE discards or stores existing measurement information (for beam(s), cell(s), RS type(s), bandwidth parts) and resets timers and measurement related UE variables depending on the parameters (or combinations of parameters) provided by the network when updating cell quality derivation parameters or beam consolidation parameters.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Existing measurement information may include beam measurement information and cell measurement information. Beam measurement information may include measurement results per SS/PBCH block, such as SS-RSRP, SS-RSRQ, SS-SINR, and measurement results per CSI-RS resource, such as CSI-RSRP, CSI-RSRQ and CSI-SINR. Beam measurements may also include CSI-RS resource measurement identifiers, and SS/PBCH block(s) indexes. Cell measurement information may include measurement results per cell based on SS/PBCH block(s) and measurement results per cell based on CSI-RS resource(s).

Cell quality derivation (CQD) parameters and beam consolidation parameters may include the following parameters. A Threshold(SSB) parameter is used for selecting additional beams for averaging for measurements based on SS/PBCH blocks. The same threshold may also be used to select additional beams to be L3 filtered and to be included in measurement reports. Thus, Threshold(SSB) may be referred to as a CQD and a beam consolidation parameter. ASN.1 notation may refer to the parameter as absThreshSSBlocksConsolidation. In some embodiments, L3 filters may be disabled in another action.

A Threshold(CSI-RS) parameter is used for selecting additional beams for averaging for measurements based on CSI-RS. The same threshold may also be used to select additional beams to be L3 filtered and to be included in measurement reports. Thus, the Threshold(CSI-RS) parameter may be referred to as a CQD and a beam consolidation parameter. ASN.1 notation may refer to the parameter as absThreshCSI-RS-Consolidation.

A N(SSB) parameter is used for the maximum number of beams to be averaged for cell measurement results based on SS/PBCH blocks. The parameter does not affect the L3 filtered beam measurements to be included in measurement report. Thus, the parameter may be referred to as a purely CQD parameter. ASN.1 notation may refer to the parameter as nroSS-BlocksToAverage.

A N(CSI-RS) parameter is used for the maximum number of beams to be averaged for cell measurement results based on CSI-RS. The parameter does not affect the L3 filtered beam measurements to be included in measurement report. Thus, the parameter may be referred to as a purely CQD parameter. ASN.1 notation may refer to the parameter as nroCSI-RS-ResourcesToAverage.

In particular embodiments, a UE may perform the following actions upon receiving a re-configuration of CQD or beam consolidation parameters. For cell measurement results, The UE evaluates whether the update of cell quality derivation parameters or beam consolidation parameters leads to changes in the way the cell quality is derived. If updates lead to changes in CQD, the UE deletes cell measurement results associated to the modified measurement object. The criteria to determine whether the updates lead to changes in CQD may be any of the following: (a) N is changed (or is configured/re-configured), regardless if the consolidation threshold is changed (or is configured/re-configured); (b) the consolidation threshold is changed (or is configured/re-configured), and N is changed to a value greater than 1; and/or (c) the consolidation threshold is changed (or is configured/re-configured), and N is not changed but its value is already greater than 1 before the re-configuration.

Otherwise, if updates dot not lead to changes in CQD, the UE may not delete cell measurement results associated to the modified measurement object. The criteria to define whether the updates do not lead to changes in CQD may be any of the following: (a) N is not changed and the consolidation threshold is not changed (or none is configured/re-configured); and/or (b) the consolidation threshold is changed, and N is not changed and its value is 1.

For beam measurement results, the UE determines whether the update of CQD or beam consolidation parameters lead to changes in the way beam measurements or the selection of beam measurements for measurement reporting are performed. If updates lead to changes in beam measurements or the selection of beam measurements for measurement reporting, the UE may delete beam measurement results associated to the modified measurement object. Criteria for whether the updates lead to changes in beam measurement or the selection of beam measurement for measurement reporting may be that the consolidation threshold is changed (or is configured/re-configured), regardless whether N is changed or not.

Otherwise, if updates dot not lead to changes in beam measurements or the selection of beam measurements for measurement reporting, the UE may not delete beam measurement results associated to the modified measurement object. Criteria for whether the updates lead to changes in beam measurement or the selection of beam measurement for measurement reporting may be that the consolidation threshold is not changed (or is not configured/re-configured).

Beam measurement results and cell measurement results can be derived based on different RS types (e.g., SS Block and CSI-RS in NR depending on network configuration. A UE may perform measurement related actions (storing/deleting, etc.) upon the update of CQD or beam consolidation parameters independently for each RS type.

If the updated parameters are associated to SSB related parameters in the modified measurement object, the UE may consider the previously described UE actions only for the measurements (i.e., for the measurement identifiers) associated to reporting configuration whose RS type is set to SSB. If the updated parameters are associated to CSI-RS in the modified measurement object, the UE may consider the previously described UE actions only for the measurements associated to reporting configuration whose RS type is set to CSI-RS.

For a given RS type (i.e., CSI-RS or SS/PBCH block) the updates of one RS may not affect the measurement associated to the other RS type. The following table describes whether the re-configuration of CQD and beam consolidation parameters affect the CQD or beam consolidation for L3 beam measurement for reporting.

| N | Threshold not modified | Threshold modified |
|---|---|---|
| N is not updated (and N = 1 in VarMeasConfig) | UE can keep cell measurements in VarListMeasResults UE can keep beam measurements in VarListMeasResults | UE can keep cell measurements in VarListMeasResults UE removes beam measurements from VarListMeasResults |
| N is not updated (and N > 1 in VarMeasConfig) | UE can keep cell measurements in VarListMeasResults UE can keep beam measurements in VarListMeasResults | UE removes cell measurements and beam measurements from VarListMeasResults |
| N is updated | UE removes cell measurements and beam measurements UE can keep beam measurements in VarListMeasResults | UE removes cell measurements and beam measurements in VarListMeasResults from VarListMeasResults |

Particular embodiments include measurement related UE variables and/or timers and/or counters. When a UE removes the cell measurement results according to the previously defined rules, the UE may also perform one or more of the following actions: (a) remove the measurement reporting entry for the measId from the VarMeasReportList, if included; (b) stop the periodical reporting timer and reset the associated information (e.g., timeToTrigger) for the measId; and/or (c) stop performing L3 beam filtered measurement results (i.e., release memory associated with L3 filters). In some embodiments, the UE receives a re-configuration of CQD parameters and beam measurements for reporting associated to SS/PBCH blocks only and does not delete measurements associated to CSI-RS, or vice versa.

In particular embodiments, the network may update the UE with cell quality derivation parameters or beam consolidation parameters over an RRC message using a measurement configuration procedure, or, more precisely, a measurement object update. The method could be written as follows in the RRC specifications depending on the level of details from the proposed method that are specified.

In some embodiments, the UE actions are based on the RS type, configured values, absence of new configuration, etc., as follows:
for each measObjectId included in the received measObjectToAddModList:
  if an entry with the matching measObjectId exists in the measObjectList within the VarMeasConfig, for this entry:
    reconfigure the entry with the value received for this measObject, except for the fields cellsToAddModList, blackCellsToAddModList, whiteCellsToAddModList, cellsToRemoveList, blackCellsToRemoveList, whiteCellsToRemoveList, referenceSignalConfig, absolute ThresholdCellQuality, maxBeamsCellQuality;
  . . . (other actions)
    for each measId associated with this measObjectId in the measIdList within the VarMeasConfig, if any
      if the received measObject includes the absThreshSS-BlocksConsolidation different from the value in VarMeasConfig for the same measObject:
        if the received measObject includes the nroSS-BlocksToAverage different from the value in VarMeasConfig for the same measObject or,
        if the nroSS-BlocksToAverage in VarMeasConfig for the same measObject is greater than one:
          if the rsType in the reportConfig associated to that measId is set to ssb:
            remove the measurement reporting entry for this measId from the VarMeasReportList, if included;
            stop the periodical reporting timer and reset the associated information (e.g., timeToTrigger) for this measId;
          else,
            remove beam measurements based on SS/PBCH block associated to the measurement reporting entry for this measId from the VarMeasReportList, if included;
      if the received measObject includes the absThreshCSI-RS-Consolidation different from the value in VarMeasConfig for the same measObject:
        if the received measObject includes the nroCSI-RS-ResourcesToAverage different from the value in VarMeasConfig for the same measObject or,
        if the nroCSI-RS-ResourcesToAverage in VarMeasConfig for the same measObject is greater than one:
          if the rsType in the reportConfig associated to that measId is set to csi-rs:
            remove the measurement reporting entry for this measId from the VarMeasReportList, if included;
            stop the periodical reporting timer and reset the associated information (e.g. timeToTrigger) for this measId;
          else,
            remove beam measurements based on CSI-RS associated to the measurement reporting entry for this measId from the VarMeasReportList, if included;
  else:
    add a new entry for the received measObject to the measObjectList within VarMeasConfig.

In some embodiments, the UE actions may be based on the RS type, regardless of the type of thresholds and other parameters configured, as follows:
for each measObjectId included in the received measObjectToAddModList:
  if an entry with the matching measObjectId exists in the measObjectList within the VarMeasConfig, for this entry:
    reconfigure the entry with the value received for this measObject, except for the fields cellsToAddModList, blackCellsToAddModList, whiteCellsToAddModList, cellsToRemoveList, blackCellsToRemoveList, whiteCellsToRemoveList, referenceSignalConfig, absoluteThresholdCellQuality, maxBeamsCellQuality;
  . . . (other actions)
    for each measId associated with this measObjectId in the measIdList within the VarMeasConfig, if any
      if the received measObject includes the absThreshSS-BlocksConsolidation different from the value in VarMeasConfig for the same measObject or,
      if the received measObject includes the nroSS-BlocksToAverage different from the value in VarMeasConfig for the same measObject:

if the rsType in the reportConfig associated to that measId is set to ssb
remove the measurement reporting entry for this measId from the VarMeasReportList, if include;
stop the periodical reporting timer and reset the associated information (e.g., timeToTrigger) for this measId;
if the received measObject includes the absThreshCSI-RS-Consolidation different from the value in VarMeasConfig for the same measObject or,
if the received measObject includes the nroCSI-RS-ResourcesToAverage different from the value in VarMeasConfig for the same measObject:
if the rsType in the reportConfig associated to that measId is set to csi-rs
remove the measurement reporting entry for this measId from the VarMeasReportList, if included;
stop the periodical reporting timer and reset the associated information (e.g. timeToTrigger) for this measId;
else:
add a new entry for the received measObject to the measObjectList within VarMeasConfig.

In some embodiments, the UE actions may be based on the RS type as long as parameters associated to a given thresholds are included in the updated measurement object, regardless if the values differ from previously configured values, as follows:
for each measObjectId included in the received measObjectToAddModList:
if an entry with the matching measObjectId exists in the measObjectList within the VarMeasConfig, for this entry:
reconfigure the entry with the value received for this measObject, except for the fields cellsToAddModList, blackCellsToAddModList, whiteCellsToAddModList, cellsToRemoveList, blackCellsToRemoveList, whiteCellsToRemoveList, referenceSignalConfig, absoluteThresholdCellQuality, maxBeamsCellQuality;
. . . (other actions)
for each measId associated with this measObjectId in the measIdList within the VarMeasConfig, if any
if the received measObject includes the absThreshSS-BlocksConsolidation or,
if the received measObject includes the nroSS-BlocksToAverage:
if the rsType in the reportConfig associated to that measId is set to ssb
remove the measurement reporting entry for this measId from the VarMeasReportList, if include;
stop the periodical reporting timer and reset the associated information (e.g., timeToTrigger) for this measId;
if the received measObject includes the absThreshCSI-RS-Consolidation or,
if the received measObject includes the nroCSI-RS-ResourcesToAverage:
if the rsType in the reportConfig associated to that measId is set to csi-rs
remove the measurement reporting entry for this measId from the VarMeasReportList, if included;
stop the periodical reporting timer and reset the associated information (e.g. timeToTrigger) for this measId;
else:
add a new entry for the received measObject to the measObjectList within VarMeasConfig.

In some embodiments, the UE actions may be as follows:
for each measObjectId included in the received measObjectToAddModList:
if an entry with the matching measObjectId exists in the measObjectList within the VarMeasConfig, for this entry:
reconfigure the entry with the value received for this measObject, except for the fields cellsToAddModList, blackCellsToAddModList, whiteCellsToAddModList, cellsToRemoveList, blackCellsToRemoveList, whiteCellsToRemoveList, referenceSignalConfig, absoluteThresholdCellQuality, maxBeamsCellQuality;
. . . (other actions)
for each measId associated with this measObjectId in the measIdList within the VarMeasConfig, if any
if the received measObject includes the absThreshSS-BlocksConsolidation or,
if the received measObject includes the nroSS-BlocksToAverage different from the value in VarMeasConfig for the same measObject:
if the rsType in the reportConfig associated to that measId is set to ssb
remove the measurement reporting entry for this measId from the VarMeasReportList, if include;
stop the periodical reporting timer and reset the associated information (e.g., time ToTrigger) for this measId;
if the received measObject includes the absThreshCSI-RS-Consolidation or,
if the received measObject includes the nroCSI-RS-ResourcesToAverage different from the value in VarMeasConfig for the same measObject:
if the rsType in the reportConfig associated to that measId is set to csi-rs
remove the measurement reporting entry for this measId from the VarMeasReportList, if included;
stop the periodical reporting timer and reset the associated information (e.g., timeToTrigger) for this measId;
else:
add a new entry for the received measObject to the measObjectList within VarMeasConfig.

In some embodiments, the UE actions may be as follows:
for each measObjectId included in the received measObjectToAddModList:
if an entry with the matching measObjectId exists in the measObjectList within the VarMeasConfig, for this entry:
reconfigure the entry with the value received for this measObject, except for the fields cellsToAddModList, blackCellsToAddModList, whiteCellsToAddModList, cellsToRemoveList, blackCellsToRemoveList, whiteCellsToRemoveList, referenceSignalConfig, absoluteThresholdCellQuality, maxBeamsCellQuality;
. . . (other actions)
for each measId associated with this measObjectId in the measIdList within the VarMeasConfig, if any if the received measObject includes the absThreshSS-BlocksConsolidation different from the value in VarMeasConfig for the same measObject or,
if the received measObject includes the nroSS-BlocksToAverage:
  if the rsType in the reportConfig associated to that measId is set to ssb
    remove the measurement reporting entry for this measId from the VarMeasReportList, if include;
    stop the periodical reporting timer and reset the associated information (e.g., timeToTrigger) for this measId;
  if the received measObject includes the absThreshCSI-RS-Consolidation different from the value in VarMeasConfig for the same measObject or,
  if the received measObject includes the nroCSI-RS-ResourcesToAverage:
    if the rsType in the reportConfig associated to that measId is set to csi-rs
    remove the measurement reporting entry for this measId from the VarMeasReportList, if included;
    stop the periodical reporting timer and reset the associated information (e.g., timeToTrigger) for this measId;
else:
  add a new entry for the received measObject to the measObjectList within VarMeasConfig.

In some embodiments, the UE actions may be based on the change of any parameter in the same IE carrying the CQD parameters and beam consolidation parameters, e.g., modification of a measurement object, regardless of the type of thresholds and other parameters configured, regardless if the values differ from previously configured values, as follows:
for each measObjectId included in the received measObjectToAddModList:
  if an entry with the matching measObjectId exists in the measObjectList within the VarMeasConfig, for this entry:
    reconfigure the entry with the value received for this measObject, except for the fields cellsToAddModList, blackCellsToAddModList, whiteCellsToAddModList, cellsToRemoveList, blackCellsToRemoveList, whiteCellsToRemoveList, referenceSignalConfig, absolute ThresholdCellQuality, maxBeamsCellQuality;
  ... (other actions)
  for each measId associated with this measObjectId in the measIdList within the VarMeasConfig, if any
    remove the measurement reporting entry for this measId from the VarMeasReportList, if included
    stop the periodical reporting timer and reset the associated information (e.g. timeToTrigger) for this measId;
  else:
    add a new entry for the received measObject to the measObjectList within VarMeasConfig.

Although the embodiments herein are described with respect to a NR measurement object updated from NR RRC, the features, benefits, steps, disclosed herein may also be applied when a UE connected to LTE is configured with NR measurement objects and, E-UTRAN reconfigures at least one NR measurement object. Depending on the parameters that are updated, the UE can perform any of the actions described in the previous embodiments.

FIG. 1 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations.

A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 1, network node 160 includes processing circuitry 170, device readable medium 180, interface 190, auxiliary equipment 184, power source 186, power circuitry 187, and antenna 162. Although network node 160 illustrated in the example wireless network of FIG. 1 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 1 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner.

In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 1. For simplicity, the wireless network of FIG. 1 only depicts network 106, network nodes 160 and 160*b*, and WDs 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 2:
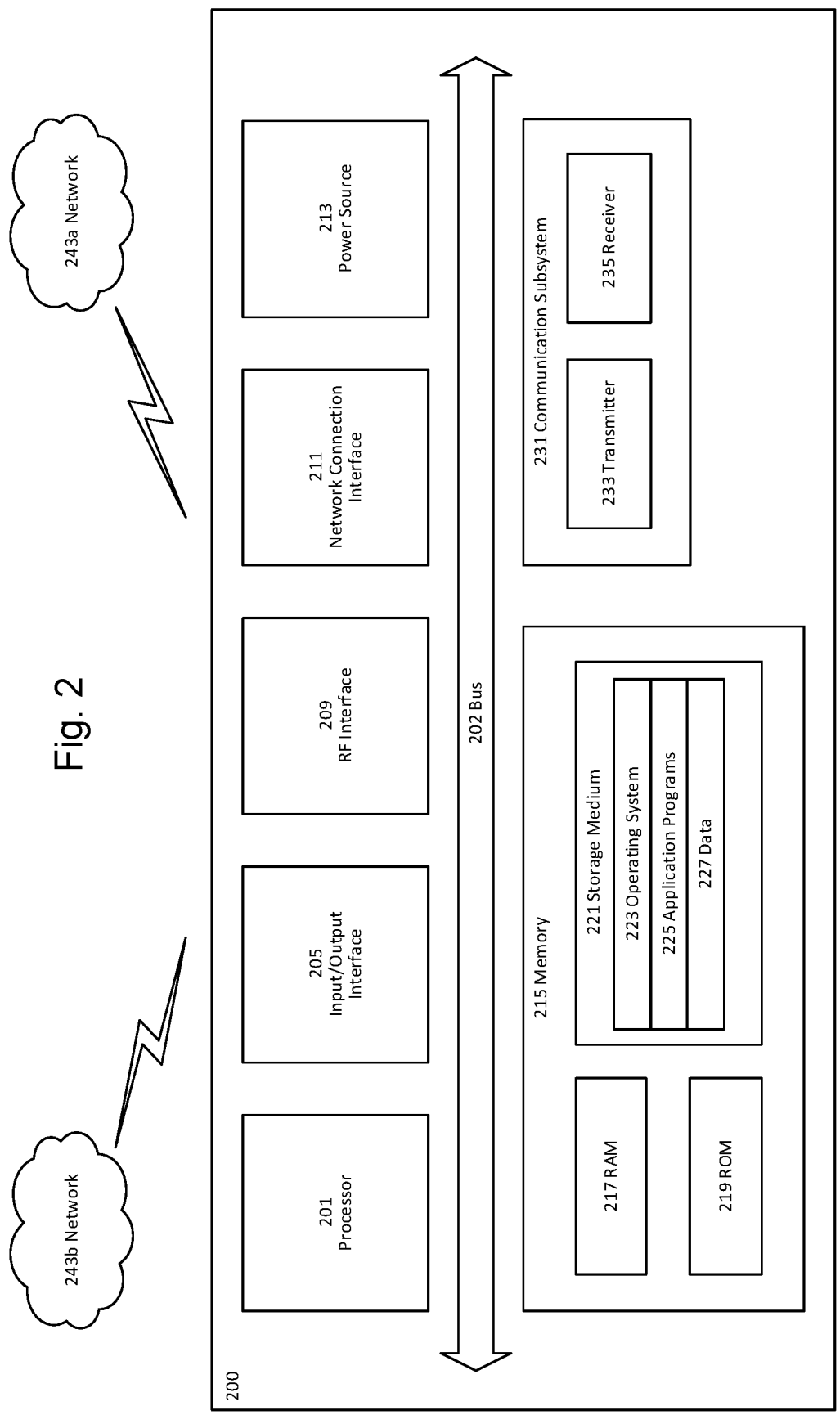
FIG. 2 illustrates an example user equipment, according to certain embodiments.

FIG. 2 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 2, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 2 is a UE, the components discussed herein are equally applicable to a WD, and vice-versa.

In FIG. 2, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may use all the components shown in FIG. 2, or only a subset of the components. The level of integration between the components may vary from one UE to another UE. Further, certain UEs may contain multiple instances of a component, such as multiple processors, memories, transceivers, transmitters, receivers, etc.

In FIG. 2, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 2, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 2, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 3:
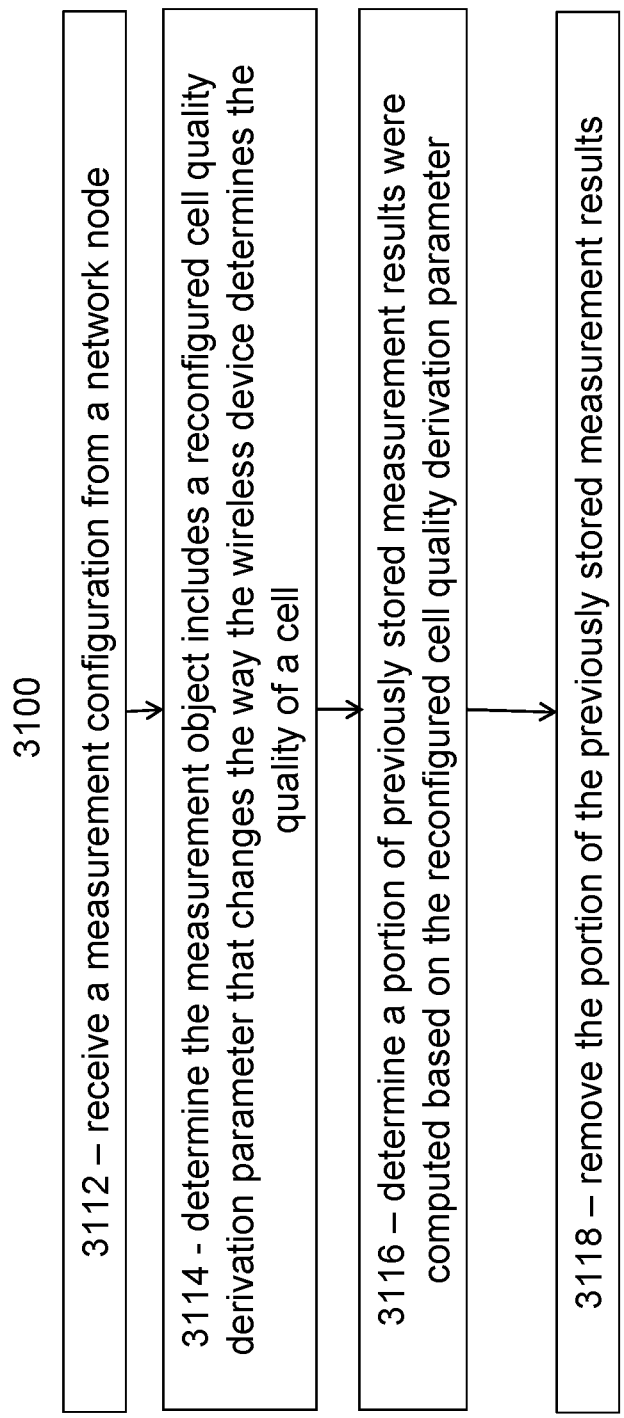
FIG. 3 is flowchart illustrating an example method in a wireless device for updating measurement configuration, according to certain embodiments.

FIG. 3 is a flowchart illustrating an example method in a user equipment for updating measurement configuration, according to certain embodiments. In particular embodiments, one or more steps of FIG. 3 may be performed by wireless device 110 described with respect to FIG. 1.

The method begins at step 3112, where the wireless device (e.g., wireless device 110) receives a measurement configuration from a network node (e.g., network node 160). The measurement configuration comprises a measurement object that includes at least one CQD parameter. The wireless device has previously stored measurement results associated with the measurement object. For example, the CQD parameter may include one or more of Threshold(SSB), Threshold(CSI-RS), N(SSB), and N(CSI-RS) described above. Some embodiments may include additional parameters that may affect how a wireless device determines a cell quality.

At step 3114, the wireless device determines the measurement object includes a reconfigured CQD parameter that changes the way the wireless device determines the quality of a cell. For example, wireless device 110 may determine the reconfigured CQD parameter changes the way the wireless device determines the quality of a cell based on the presence of the CQD parameter in the measurement object, based on the CQD parameter changing from a previous value, or based on a combination of CQD parameters.

In particular embodiments, the measurement object includes a first CQD parameter indicating a maximum number of beams (e.g., N(SSB) or N(CSI-RS)) to average for cell measurement results and a second CQD parameter indicating a signal quality threshold (e.g., Threshold(SSB) or Threshold(CSI-RS)) for selecting additional beams to average for cell measurement results. Determining the measurement object includes a reconfigured parameter that changes the way the wireless device determines the quality of a cell comprises determining the measurement object includes at least one of the first CQD parameter and the second CQD parameter, or determining at least one of the first CQD parameter and the second CQD parameter is changed.

In particular embodiments, determining the measurement object includes a reconfigured parameter that changes the way the wireless device determines the quality of a cell comprises determining: the first parameter is changed; or the second parameter is changed, and the first parameter is changed to a value greater than one or the first parameter was not changed but was greater than one before receiving the measurement configuration.

In particular embodiments, the measurement configuration further comprises a report configuration associated with the measurement object. The report configuration comprises an indication of a reference signal type (e.g., CSI-RS or SS). Determining the measurement object includes a reconfigured parameter that changes the way the wireless device determines the quality of a cell further comprises determining that the first CQD parameter and the second CQD parameter are based on CSI-RS and the reference signal type is CSI-RS, or determining that the first CQD parameter and the second CQD parameter are based on SS and the reference signal type is SS.

At step 316, the wireless device determines a portion of the previously stored measurement results were computed based on the reconfigured CQD parameter. For example, wireless device 110 may determine its VarMeasReportList includes a measId of the received measurement object and that the measurement reporting entry includes measurement results based on the reconfigured CQD parameters. For example, the measurement reporting entry may include both SS and CSI-RS based measurements. If the reconfigured CQD parameter is a CSI-RS parameter, then the wireless device may determine the CSI-RS measurement results are based on the configured CQD parameter. In some embodiments, all or none of the measurements may be based on the reconfigured CQD parameter.

At step 3118, the wireless device removes the portion of the previously stored measurement results. For example, wireless device 110 may remove the measurements in the VarMeasReportList identified in the previous step, while keeping other measurements. A particular advantage is that only the measurements that depend on the reconfigured CQD parameters are removed, while other measurements, if any, may be preserved.

The wireless device may also reset timers and remove measurement information associated with the removed measurement results. For example, wireless device 110 may stop a periodical reporting timer and reset associated information (e.g., timeToTrigger).

Modifications, additions, or omissions may be made to method 3100 of FIG. 3. Additionally, one or more steps in the method of FIG. 3 may be performed in parallel or in any suitable order.

Figure 4:
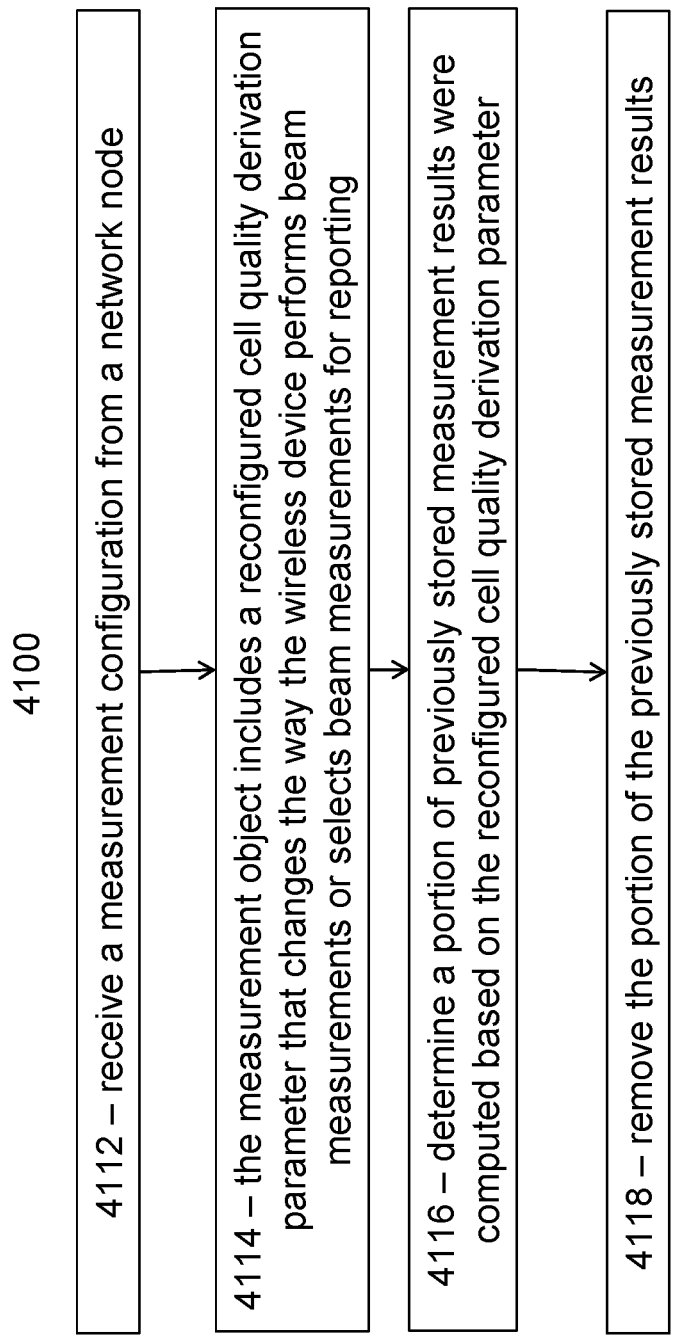
FIG. 4 is a flowchart illustrating another example method in a wireless device for updating measurement configuration, according to certain embodiments.

FIG. 4 is a flowchart illustrating another example method in a wireless device for updating measurement configuration, according to certain embodiments. In particular embodiments, one or more steps of FIG. 4 may be performed by network node 160 described with respect to FIG. 1.

The method begins at step 4112, where the wireless device (e.g., wireless device 110) receives a measurement configuration from a network node (e.g., network node 160). The measurement configuration comprises a measurement object that includes at least one CQD parameter. The wireless device has previously stored measurement results associated with the measurement object. For example, the CQD parameter may include one or more of Threshold(SSB), Threshold(CSI-RS), N(SSB), and N(CSI-RS) described above. Some embodiments may include additional parameters that may affect how a wireless device determines a cell quality.

At step 4114, the wireless device determines the measurement object includes a reconfigured CQD parameter that changes the way the wireless device performs beam measurements or selects beam measurements for reporting. For example, wireless device 110 may determine the reconfigured CQD parameter changes the way the wireless device performs beam measurements or selects beam measurements for reporting based on the presence of the CQD parameter in the measurement object, based on the CQD parameter changing from a previous value, or based on a combination of CQD parameters.

In particular embodiments, the CQD parameter comprises a signal quality threshold (e.g., Threshold(SSB) or Threshold(CSI-RS)) for selecting additional beams to average for cell measurement results. Determining the measurement object includes a reconfigured parameter that changes the way the wireless device performs beam measurements or selects beam measurements for reporting comprises determining the measurement object includes the CQD parameter, or determining the CQD parameter is changed.

In particular embodiments, the CQD parameter comprises a signal quality threshold for selecting additional beams to average based on a CSI-RS or a signal quality threshold for selecting additional beams to average based on a SS. The measurement configuration further comprises a report configuration associated with the measurement object. The report configuration comprises an indication of a reference signal type (e.g., CSI-RS or SS). Determining the measurement object includes a reconfigured parameter that changes the way the wireless device performs beam measurements or selects beam measurements for reporting further comprises determining that the CQD parameter is based on CSI-RS and the reference signal type is CSI-RS, or determining that the CQD parameter is based on SS and the reference signal type is SS.

At step 416, the wireless device determines a portion of the previously stored measurement results were computed based on the reconfigured CQD parameter. For example, wireless device 110 may determine its VarMeasReportList includes a measId of the received measurement object and that the measurement reporting entry includes measurement results based on the reconfigured CQD parameters. For example, the measurement reporting entry may include both SS and CSI-RS based measurements. If the reconfigured CQD parameter is a CSI-RS parameter, then the wireless device may determine the CSI-RS measurement results are based on the configured CQD parameter. In some embodiments, all or none of the measurements may be based on the reconfigured CQD parameter.

At step 4118, the wireless device removes the portion of the previously stored measurement results. For example, wireless device 110 may remove the measurements in the VarMeasReportList identified in the previous step, while keeping other measurements. A particular advantage is that only the measurements that depend on the reconfigured CQD parameters are removed, while other measurements, if any, may be preserved.

The wireless device may also reset timers and remove measurement information associated with the removed measurement results. For example, wireless device 110 may stop a periodical reporting timer and reset associated information (e.g., timeToTrigger).

Modifications, additions, or omissions may be made to method 4100 of FIG. 4. Additionally, one or more steps in the method of FIG. 4 may be performed in parallel or in any suitable order.

Figure 5:
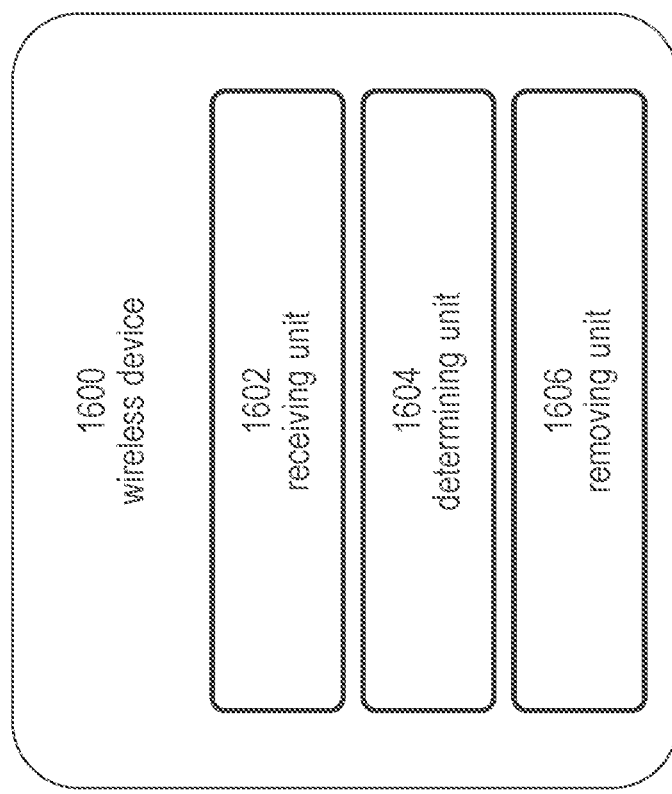
FIG. 5 illustrates a schematic block diagram of an apparatus in a wireless network, according to certain embodiments.

FIG. 5 illustrates a schematic block diagram of an apparatus in a wireless network (for example, wireless device 110 of the wireless network illustrated in FIG. 1). Apparatus 1600 is operable to carry out the example methods described with reference to FIGS. 3 and 4, and possibly any other processes or methods disclosed herein. It is also to be understood that the methods of FIGS. 3 and 4 are not necessarily carried out solely by apparatus 1600. At least some operations of the method can be performed by one or more other entities.

Virtual apparatus 1600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause receiving unit 1602, determining unit 1604, removing unit 1606, and any other suitable units of apparatus 1600 to perform corresponding functions according one or more embodiments of the present disclosure.

As illustrated in FIG. 5, apparatus 1600 includes receiving unit 1602 configured to receive measurement configuration from a network node. Apparatus 1600 also includes determining unit 1604 configured to determine a measurement object includes a reconfigured CQD parameter that changes the way the wireless device determines the quality of a cell; determine a measurement object includes a reconfigured CQD parameter that changes the way the wireless device performs beam measurements or selects beam measurements for reporting; and/or determine a portion of the previously stored measurement results were computed based on the reconfigured CQD parameter. Apparatus 1600 also includes removing unit 1606 configured to remove the portion of the previously stored measurement results and any associated timers or other information.

Figure 6:
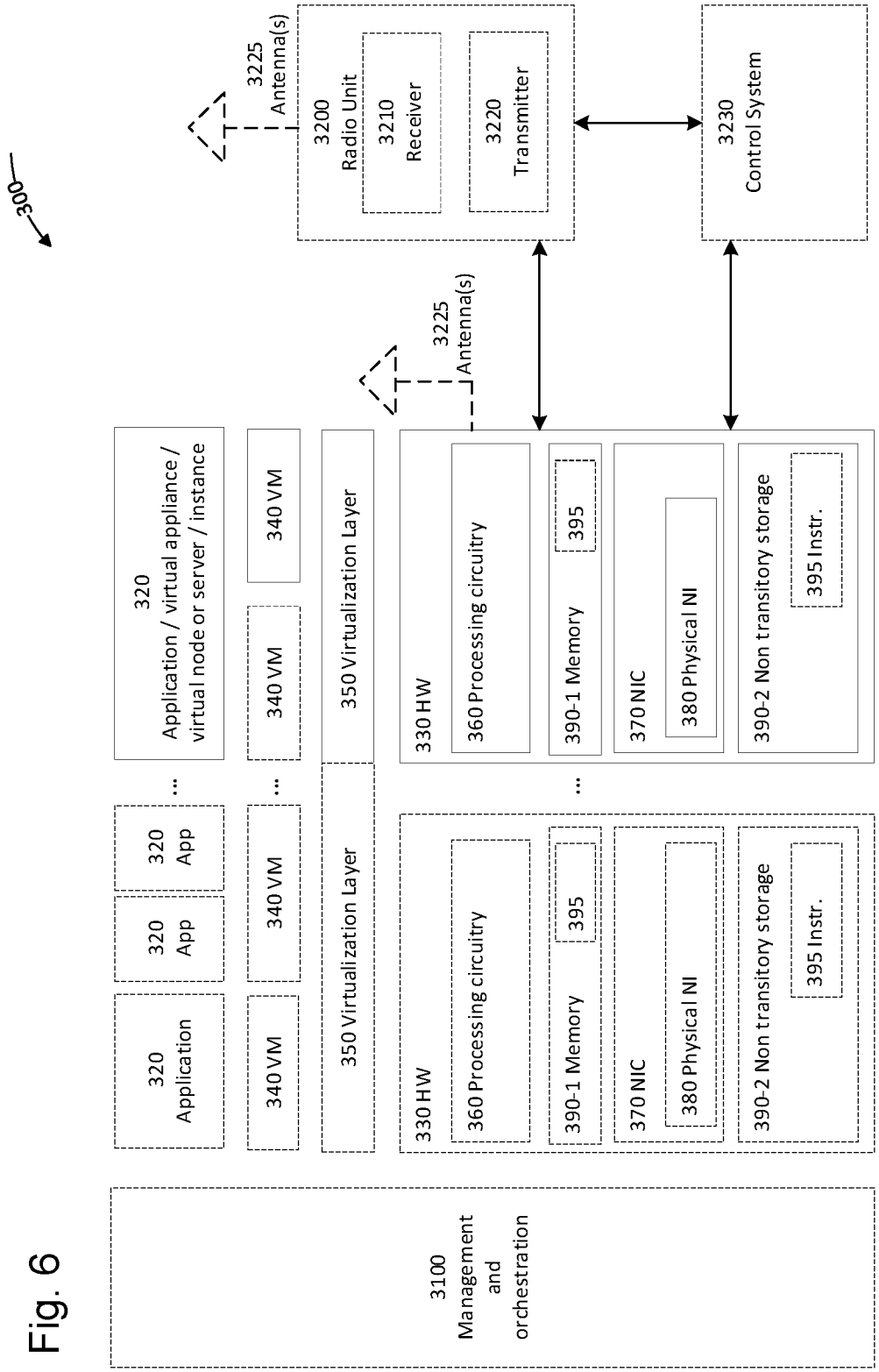
FIG. 6 illustrates an example virtualization environment, according to certain embodiments.

FIG. 6 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 6, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 18.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 7:
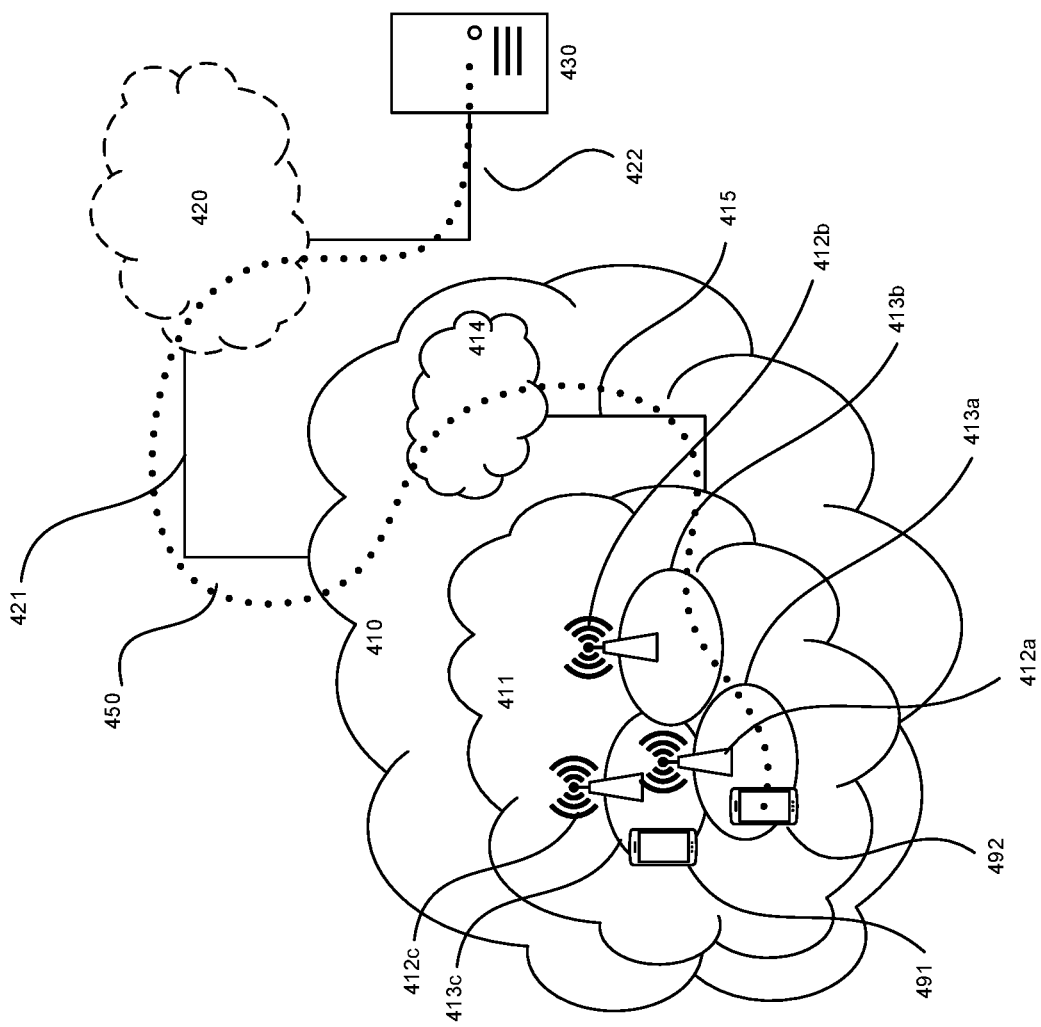
FIG. 7 illustrates an example telecommunication network connected via an intermediate network to a host computer, according to certain embodiments.

With reference to FIG. 7, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 7 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 8:
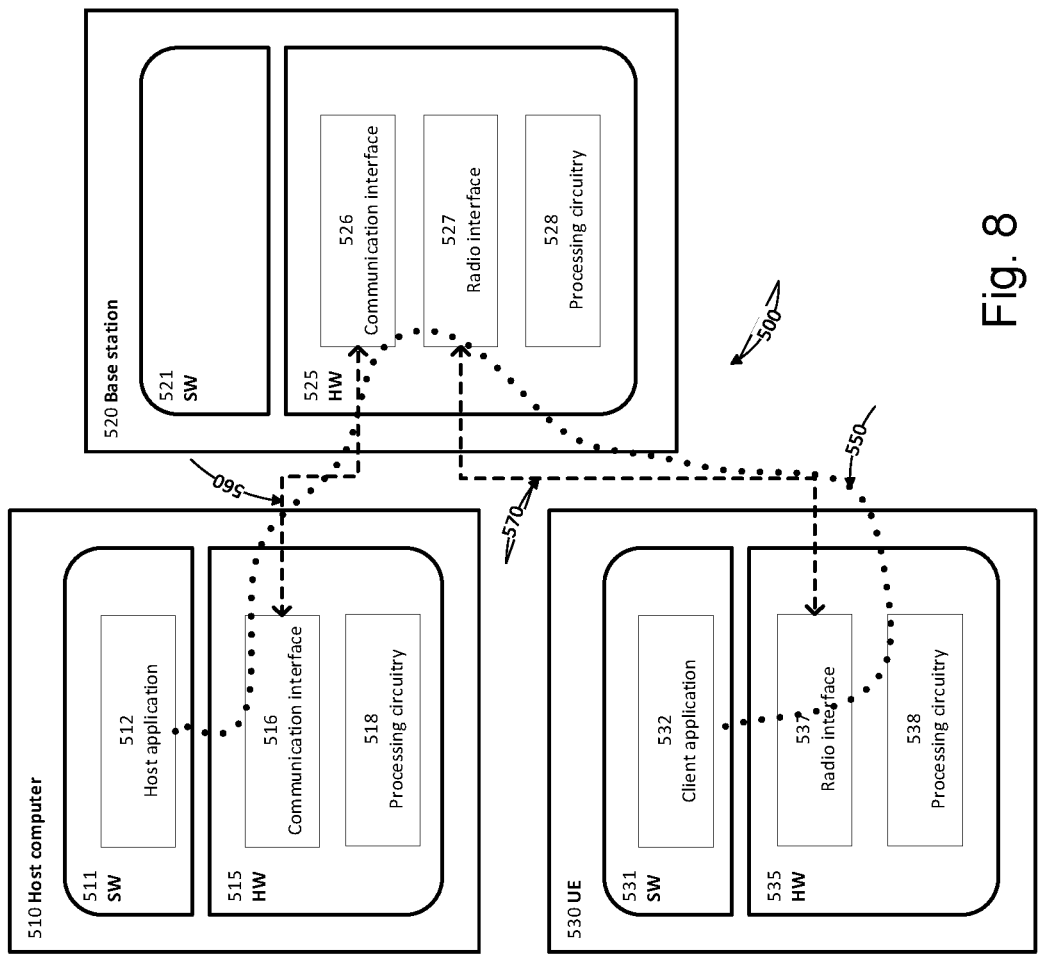
FIG. 8 illustrates an example host computer communicating via a base station with a user equipment over a partially wireless connection, according to certain embodiments.

FIG. 8 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 8. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 8) served by base station 520. Communication interface 526 may be configured to facilitate connection 560 to host computer 510. Connection 560 may be direct, or it may pass through a core network (not shown in FIG. 8) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 8 may be similar or identical to host computer 430, one of base stations 412a, 412b, 412c and one of UEs 491, 492 of FIG. 7, respectively. This is to say, the inner workings of these entities may be as shown in FIG. 5 and independently, the surrounding network topology may be that of FIG. 7.

In FIG. 8, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, which may provide faster internet access for users.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 9:
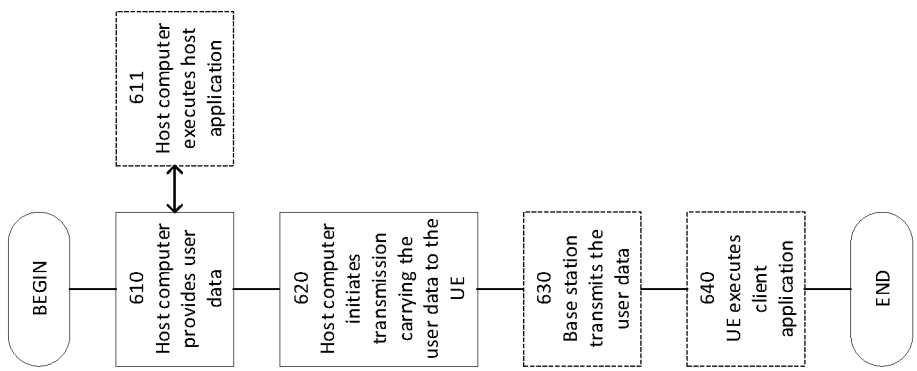
FIG. 9 is a flowchart illustrating a method implemented, according to certain embodiments.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 10:
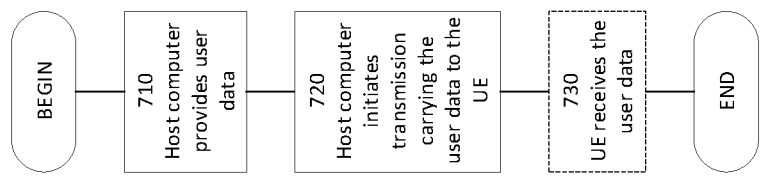
FIG. 10 is a flowchart illustrating a method implemented in a communication system, according to certain embodiments.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1×Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CN Core Network
CP Cyclic Prefix
CPICH Common Pilot Channel
CPICH Ec/No CPICH Received energy per chip divided by the power density in the band
CQI Channel Quality information
CRC Cyclic Redundancy Check
C-RNTI Cell RNTI
CSI Channel State Information
CSI-RS CSI Reference Signal
DCCH Dedicated Control Channel
DCI Downlink Control Information
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
ETWS Earthquake and Tsunami Warning System
E-UTRA Evolved UTRA
E-UTRAN Evolved UTRAN
FDD Frequency Division Duplex
GERAN GSM EDGE Radio Access Network
gNB Base station in NR
GNSS Global Navigation Satellite System
GSM Global System for Mobile communication
HARQ Hybrid Automatic Repeat Request
HF High Frequency/High Frequencies
HO Handover
HSPA High Speed Packet Access
HRPD High Rate Packet Data
IMSI International Mobile Subscriber Identity
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PI Paging Indicator
PO Paging Occasion
PRACH Physical Random Access Channel
P-RNTI Paging RNTI
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAR Random Access Response
RA-RNTI Random Access RNTI
RNA RAN Notification Area
RNTI Radio Network Temporary Identifier
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SAE System Architecture Evolution
SCH Synchronization Channel
SCell Secondary Cell
SDU Service Data Unit
SFN System Frame Number or Single Frequency Network
SGW Serving Gateway
SI System Information
SIB System Information Block
SNR Signal to Noise Ratio
SON Self Optimized Network
SS Synchronization Symbol
SSS Secondary Synchronization Signal
S-TMSI SAE-TMSI
TDD Time Division Duplex
TDOA Time Difference of Arrival
TMSI Temporary Mobile Subscriber Identity
TRP Transmission/Reception Point
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device for updating measurement configuration, the method comprising:
   receiving a measurement configuration from a network node, the measurement configuration comprising a measurement object that includes at least one cell quality derivation parameter, wherein the wireless device has previously stored measurement results associated with the measurement object;
   determining the measurement object includes a reconfigured cell quality derivation parameter that changes the way the wireless device determines the quality of a cell;
   determining a portion of the previously stored measurement results were computed based on the reconfigured cell quality derivation parameter, wherein the portion of the previously stored measurement results comprises synchronization symbol (SS) and channel state information reference signal (CSI-RS) based measurements; and
   removing the portion of the previously stored measurement results.

2. The method of claim 1, wherein removing the portion of the previously stored measurement results further comprises resetting timers and removing measurement information associated with the removed measurement results.

3. The method of claim 1,
   wherein the measurement object includes a first cell quality derivation parameter indicating a maximum number of beams to average for cell measurement results and a second cell quality derivation parameter indicating a signal quality threshold for selecting additional beams to average for cell measurement results; and
   wherein determining the measurement object includes the reconfigured cell quality derivation parameter that changes the way the wireless device determines the quality of a cell comprises determining the measurement object includes at least one of the first cell quality derivation parameter and the second cell quality derivation parameter.

4. The method of claim 3, wherein determining the measurement object includes the reconfigured parameter that changes the way the wireless device determines the quality of a cell comprises determining at least one of the first cell quality derivation parameter and the second cell quality derivation parameter is changed.

5. The method of claim 3, wherein determining the measurement object includes the reconfigured cell quality derivation parameter that changes the way the wireless device determines the quality of a cell comprises determining:
   the first parameter is changed; or
   the second parameter is changed, and the first parameter is changed to a value greater than one or the first parameter was not changed but was greater than one before receiving the measurement configuration.

6. The method of claim 3, wherein:
   the first cell quality derivation parameter comprises a maximum number of beams to average for cell measurements based on a channel state information reference signal (CSI-RS) and the second cell quality derivation parameter comprises a signal quality threshold for selecting additional beams to average based on a CSI-RS; or
   the first cell quality derivation parameter comprises a maximum number of beams to average for cell measurements based on a synchronization symbol (SS) and the second cell quality derivation parameter comprises a signal quality threshold for selecting additional beams to average based on a SS.

7. The method of claim 6, wherein:
   the measurement configuration further comprises a report configuration associated with the measurement object, the report configuration comprising an indication of a reference signal type, wherein the reference signal type is one of CSI-RS or SS; and
   determining the measurement object includes the reconfigured cell quality derivation parameter that changes the way the wireless device determines the quality of a cell further comprises determining that the first cell quality derivation parameter and the second cell quality derivation parameter are based on CSI-RS and the reference signal type is CSI-RS, or determining that the first cell quality derivation parameter and the second cell quality derivation parameter are based on SS and the reference signal type is SS.

8. A wireless device operable to update a measurement configuration, the wireless device comprising processing circuitry operable to:
   receive a measurement configuration from a network node, the measurement configuration comprising a measurement object that includes at least one cell quality derivation parameter, wherein the wireless device has previously stored measurement results associated with the measurement object;

determine the measurement object includes a reconfigured cell quality derivation parameter that changes the way the wireless device determines the quality of a cell;

determine a portion of the previously stored measurement results were computed based on the reconfigured cell quality derivation parameter, wherein the portion of the previously stored measurement results comprises synchronization symbol (SS) and channel state information reference signal (CSI-RS) based measurements; and remove the portion of the previously stored measurement results.

9. The wireless device of claim 8, wherein the processing circuitry is further operable to reset timers and remove measurement information associated with the removed measurement results.

10. The wireless device of claim 8, wherein the measurement object includes a first cell quality derivation parameter indicating a maximum number of beams to average for cell measurement results and a second cell quality derivation parameter indicating a signal quality threshold for selecting additional beams to average for cell measurement results; and wherein the processing circuitry is operable to determine the measurement object includes the reconfigured cell quality derivation parameter that changes the way the wireless device determines the quality of a cell by determining the measurement object includes at least one of the first cell quality derivation parameter and the second cell quality derivation parameter.

11. The wireless device of claim 10, wherein the processing circuitry is operable to determine the measurement object includes the reconfigured cell quality derivation parameter that changes the way the wireless device determines the quality of a cell by determining at least one of the first cell quality derivation parameter and the second cell quality derivation parameter is changed.

12. The wireless device of claim 10, wherein the processing circuitry is operable to determine the measurement object includes the reconfigured cell quality derivation parameter that changes the way the wireless device determines the quality of a cell by determining:

the first parameter is changed; or the second parameter is changed, and the first parameter is changed to a value greater than one or the first parameter was not changed but was greater than one before receiving the measurement configuration.

13. The wireless device of claim 10, wherein:

the first cell quality derivation parameter comprises a maximum number of beams to average for cell measurements based on a channel state information reference signal (CSI-RS) and the second cell quality derivation parameter comprises a signal quality threshold for selecting additional beams to average based on a CSI-RS; or the first cell quality derivation parameter comprises a maximum number of beams to average for cell measurements based on a synchronization symbol (SS) and the second cell quality derivation parameter comprises a signal quality threshold for selecting additional beams to average based on a SS.

14. The wireless device of claim 13, wherein:

the measurement configuration further comprises a report configuration associated with the measurement object, the report configuration comprising an indication of a reference signal type, wherein the reference signal type is one of CSI-RS or SS; and wherein the processing circuitry is operable to determine the measurement object includes the reconfigured cell quality derivation parameter that changes the way the wireless device determines the quality of a cell by determining that the first cell quality derivation parameter and the second cell quality derivation parameter are based on CSI-RS and the reference signal type is CSRS, or determining that the first cell quality derivation parameter and the second cell quality derivation parameter are based on SS and the reference signal type is SS.

15. A method performed by a wireless device for updating measurement configuration, the method comprising:

receiving a measurement configuration from a network node, the measurement configuration comprising a measurement object that includes at least one cell quality derivation parameter, wherein the wireless device has previously stored measurement results associated with the measurement object;

determining the measurement object includes a reconfigured cell quality derivation parameter that changes the way the wireless device performs beam measurements or selects beam measurements for reporting;

determining a portion of the previously stored measurement results were computed based on the reconfigured cell quality derivation parameter, wherein the portion of the previously stored measurement results comprises synchronization symbol (SS) and channel state information reference signal (CSI-RS) based measurements; and removing the portion of the previously stored measurement results.

16. The method of claim 15, wherein removing the portion of the previously stored measurement results further comprises resetting timers and removing measurement information associated with the removed measurement results.

17. The method of claim 15, wherein the cell quality derivation parameter comprises a signal quality threshold for selecting additional beams to average for cell measurement results; and wherein determining the measurement object includes the reconfigured cell quality derivation parameter that changes the way the wireless device performs beam measurements or selects beam measurements for reporting comprises determining the measurement object includes the cell quality derivation parameter.

18. The method of claim 17, wherein determining the measurement object includes the reconfigured cell quality derivation parameter that changes the way the wireless device performs beam measurements or selects beam measurements for reporting comprises determining the cell quality derivation parameter is changed.

19. The method of claim 17, wherein the cell quality derivation parameter comprises a signal quality threshold for selecting additional beams to average based on a CSI-RS or a signal quality threshold for selecting additional beams to average based on a SS.

20. The method of claim 19, wherein:

the measurement configuration further comprises a report configuration associated with the measurement object, the report configuration comprising an indication of a reference signal type, wherein the reference signal type is one of CSI-RS or SS; and determining the measurement object includes the reconfigured cell quality derivation parameter that changes the way the wireless device performs beam measurements or selects beam measurements for reporting further comprises determining that the cell quality derivation parameter is based on CSI-RS and the reference signal type is CSI-RS, or determining that the cell quality derivation parameter is based on SS and the reference signal type is SS.

* * * * *